United States Patent
Giacalone et al.

(10) Patent No.: US 7,047,272 B2
(45) Date of Patent: May 16, 2006

(54) ROUNDING MECHANISMS IN PROCESSORS

(75) Inventors: Jean-Pierre Giacalone, Vence (FR); Anne Lombardot, Grasse (FR); Francois Theodorou, Cagnes-sur-Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 1104 days.

(21) Appl. No.: 09/411,186

(22) Filed: Oct. 1, 1999

(65) Prior Publication Data

US 2003/0055860 A1 Mar. 20, 2003

(30) Foreign Application Priority Data

Oct. 6, 1998 (EP) ............................... 98402455
Oct. 6, 1998 (EP) ............................... 98402458

(51) Int. Cl.
  *G06F 7/38* (2006.01)
  *G06F 7/00* (2006.01)

(52) U.S. Cl. .................. 708/551; 708/525; 708/497
(58) Field of Classification Search ................ 708/551, 708/497, 525
  See application file for complete search history.

(56) References Cited

U.S. PATENT DOCUMENTS

| | | | |
|---|---|---|---|
| 5,128,889 A | 7/1992 | Nakano | 364/748 |
| 5,218,563 A * | 6/1993 | Juri et al. | 708/551 |
| 5,561,619 A * | 10/1996 | Watanabe | 708/525 |
| 5,581,496 A * | 12/1996 | Lai | 708/525 |
| 5,586,069 A * | 12/1996 | Dockser | 708/525 |
| 5,754,458 A | 5/1998 | Beraha et al. | |
| 6,424,955 B1 * | 7/2002 | Wong | 708/525 |

FOREIGN PATENT DOCUMENTS

EP  0 469 841 A  2/1992

OTHER PUBLICATIONS

TI–27677, *A Bit Field Processor*, co–filed as a regular application Oct. 1, 1999.
TI–27678, *Rounding Mechanisms in Processors*, co–filed as a regular application Oct. 1, 1999.
TI–27679, *Linear Vector Computation*, co–filed as a regular application Oct. 1, 1999.

(Continued)

*Primary Examiner*—Tan V. Mai
(74) *Attorney, Agent, or Firm*—Gerald E. Laws; W. James Brady, III; Frederick J. Telecky, Jr.

(57) ABSTRACT

An arithmetic unit, for example a multiply and accumulate (MAC) unit 42, for a processing engine includes a partial product reduction tree 480. The partial product reduction tree will generate carry results and provides a final output to a final adder 470 connected to the partial production reduction tree. Unbiased rounding logic 476 is provided. A carry propagation tree is responsive to the carry results for anticipating a zero on each of N least significant bits of the final adder. When zero is anticipated on each of N least significant bits of the final adder, the carry propagation tree is operable to generate an output signal 477 which is used by the unbiased rounding stage to force the (N+1)th least significant bit of the final adder to zero. Through the use of a carry propagation tree to predict, or anticipate zeros on the N least significant bits, unbiased rounding can be effected without a time penalty in that a carry propagation tree can be configured to be at least a rapid as the carry propagation of the final adder. Where a zero anticipation function is provided, this can also be mapped onto the carry propagation tree, thus providing an efficient hardware implementation through sharing of that hardware between functions.

18 Claims, 22 Drawing Sheets

OTHER PUBLICATIONS

TI–27680, *Hardware Accelerator/Acceleration for Processing Systems*, co–filed as a regular application Oct. 1, 1999.
TI–27681, *Pipeline Protection*, co–filed as a regular application Oct. 1, 1999.
TI–27682, *Pipelined Hardware Stack*, co–filed as a regular application Oct. 1, 1999.
TI–27683, *A Processor With Conditional Execution of an Instruction Pair*, co–filed as a regular application Oct. 1, 1999.
TI–27684, *A Processor With Local Instruction Looping*, co–filed as a regular application Oct. 1, 1999.
TI–27685, *Compound Memory Access Instructions*, co–filed as a regular application Oct. 1, 1999.
TI–27686, *A Processor With a Computed Repeat Instruction*, co–filed as a regular application Oct. 1, 1999.
TI–27688, *A Processor With Apparatus for Verifying Instruction Parallelism*, co–filed as a regular application Oct. 1, 1999.
TI–27689, *Cache Miss Benchmarking*, co–filed as a regular application Oct. 1, 1999.
TI–27690, *A Processor With Apparatus for Indexed Branch During Instruction Iteration*, co–filed as a regular application Oct. 1, 1999.
TI–27691, *Circular Buffer Management*, co–filed as a regular application Oct. 1, 1999.
TI–27700, *Method and Apparatus for Accessing a Memory Core Multiple Times in a Single Clock Cycle*, co–filed as a regular application Oct. 1, 1999.
TI–27757, *Improved Multiplier Accumulator Circuits*, co–filed as a regular application Oct. 1, 1999.
TI–27758, *Zero Anticipation Method and Apparatus*, co–filed as a regular application Oct. 1, 1999.
TI–27759, *Trace FIFO Management*, co–filed as a regular application Oct. 1, 1999.
TI–27760, *Stack Pointer Management*, co–filed as a regular application Oct. 1, 1999.
TI–27761, *Software Breakpoint in a Delay Slot*, co–filed as a regular application Oct. 1, 1999.
TI–27762, *Cache Coherence During Emulation*, co–filed as a regular application Oct. 1, 1999.
TI–27763, *Memory Access Using Byte Qualifiers*, co–filed as a regular application Oct. 1, 1999.
TI–27764, *Dual Interrupt Vector Mapping*, co–filed as a regular application Oct. 1, 1999.
TI–28234, *Pipeline Protection*, co–filed as a regular application Oct. 1, 1999.
TI–28433, *Improvements in or Relating to Microprocessors*, co–filed as a regular application Oct. 1, 1999.
Owen, R.; *A Sub 10 Nanosecond Multiplier and Multiplier Accumulator*, vol. 30, Nov. 18–20, 1986, pp. 14/5 1–5, N. Hollywood, US.
Hillman, G.D.; *DSP56200: An Algorithm–Specific Digital Signal Processor Peripheral*, Proc. Of the IEEE, vol. 75, No. 9, Sep. 1987, pp. 1185–1191.
Hokenek, E., et al.; Leading–Zero Anticopator (LZA) in the IBM RISC System/6000 Floating–Point Execution Unit, IBM Journal, Research and Development, 34(1990)Jan., No. 1, Armonk, NY, pp. 71–77.

* cited by examiner

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| 202 INST. 1 | $PF_1$ | $F_1$ | $D_1$ | $AD_1$ | $AC_1$ | $R_1$ | $E_1$ | | | | |
| 204 INST. 2 | | $PF_2$ | $F_2$ | $D_2$ | $AD_2$ | $AC_2$ | $R_2$ | $E_2$ | | | |
| 206 INST. 3 | | | $PF_3$ | $F_3$ | $D_3$ | $AD_3$ | $AC_3$ | $R_3$ | $E_3$ | | |
| 208 INST. 4 | | | | $PF_4$ | $F_4$ | $D_4$ | $AD_4$ | $AC_4$ | $R_4$ | $E_4$ | |
| 210 INST. 5 | | | | | $PF_5$ | $F_5$ | $D_5$ | $AD_5$ | $AC_5$ | $R_5$ | |
| 212 INST. 6 | | | | | | $PF_6$ | $F_6$ | $D_6$ | $AD_6$ | $AC_6$ | $R_6$ |
| 214 INST. 7 | | | | | | | $PF_7$ | $F_7$ | $D_7$ | $AD_7$ | $AC_7$ |

FIG. 6

| $Y_{i+1} Y_i Y_{i-1}$ | p2 p1 sg | FUNCTION |
|---|---|---|
| 0  0  0 | 0  0  0 | 0* MULTIPLICAND |
| 0  0  1 | 0  1  0 | 1* MULTIPLICAND |
| 0  1  0 | 0  1  0 | 1* MULTIPLICAND |
| 0  1  1 | 1  0  0 | 2* MULTIPLICAND |
| 1  0  0 | 1  0  1 | −2* MULTIPLICAND |
| 1  0  1 | 0  1  1 | −1* MULTIPLICAND |
| 1  1  0 | 0  1  1 | −1* MULTIPLICAND |
| 1  1  1 | 0  0  0 | 0* MULTIPLICAND |

FIG. 12
| p2 p1 sg | PP | FUNCTION |
|---|---|---|
| 0 0 0 | 0 | 0 |
| 0 1 0 | $X_i$ | 1* MULTIPLICAND |
| 1 1 0 | | DON'T CARE |
| 1 0 0 | $X_{i-1}$ | 2* MULTIPLICAND |
| 1 0 1 | $\overline{X_{i-1}}$ | -2* MULTIPLICAND |
| 0 1 1 | $\overline{X_i}$ | -1* MULTIPLICAND |
| 1 1 1 | | DON'T CARE |
| 0 0 0 | 1 | -1 |
FIG. 13A
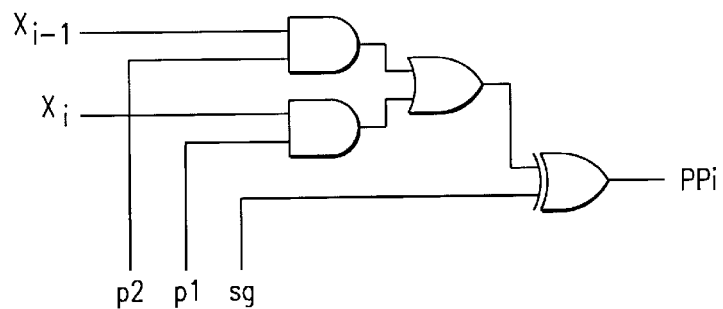
FIG. 13B
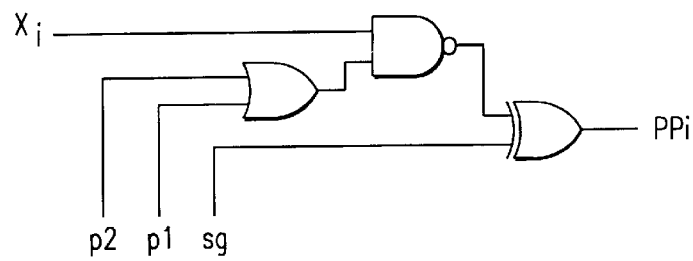

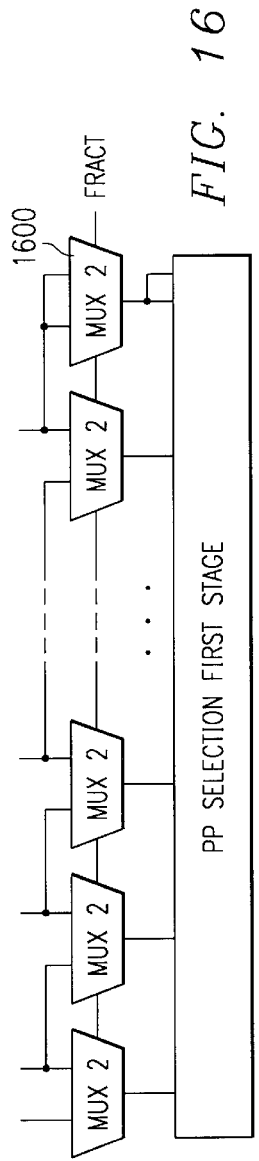
FIG. 16
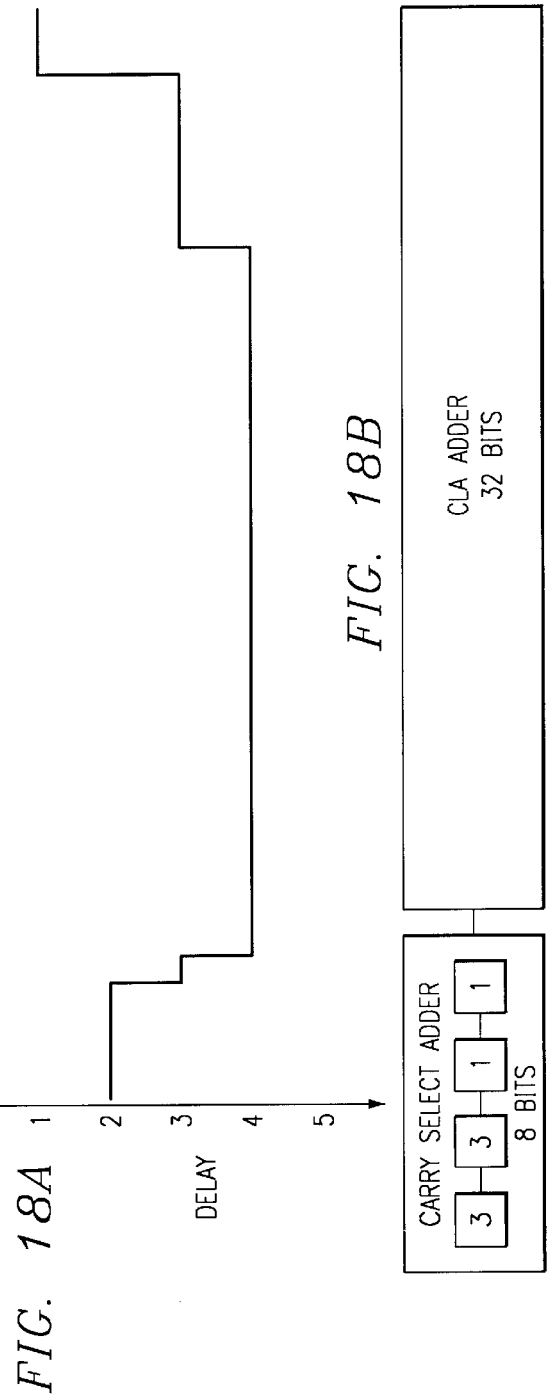
FIG. 18A
FIG. 18B

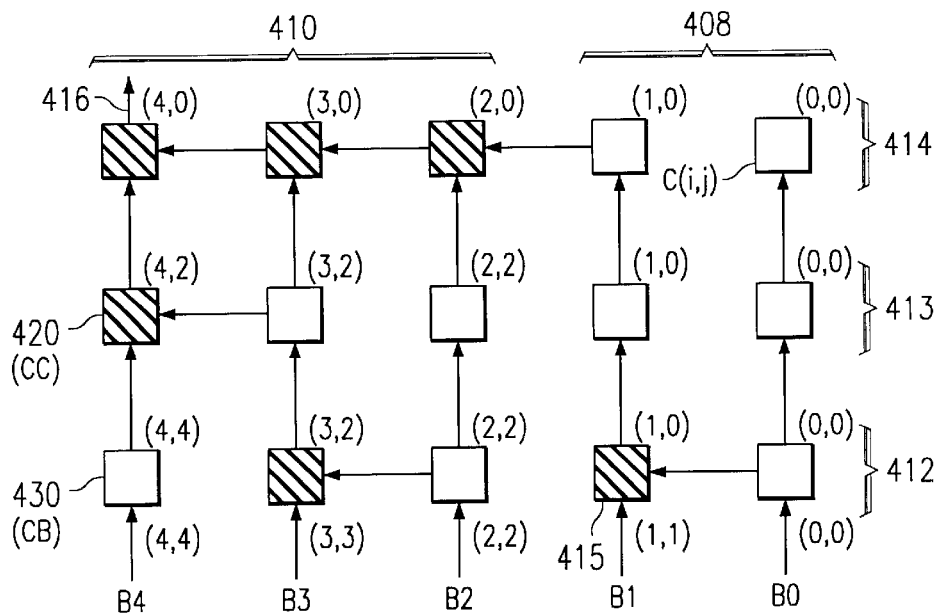
FIG. 20B
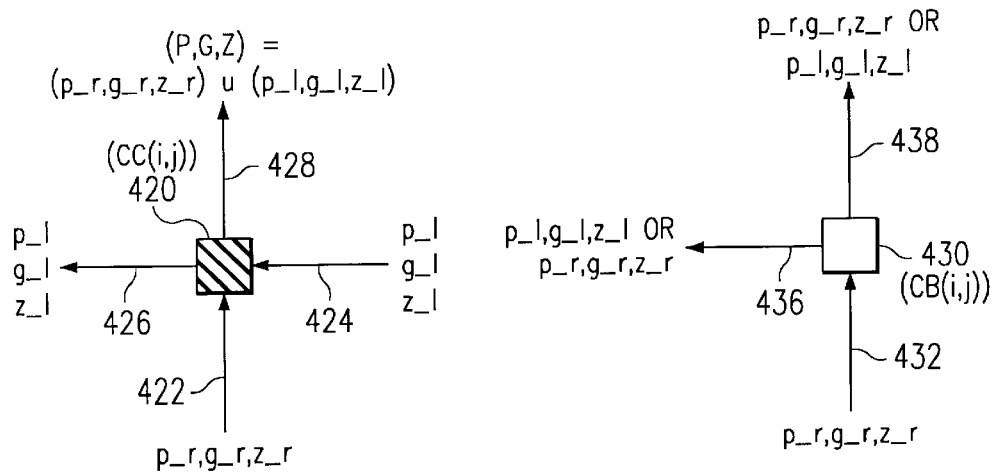
FIG. 21
FIG. 22

| BIT POS. # | 16 | 15 | 14 | 13 | 12 | 11 | ...... |
|---|---|---|---|---|---|---|---|
| | 0 | 1 | 0 | 0 | 0 | 0 | ...... |

| BIT POS. # | 16 | 15 | 14 | 13 | 12 | 11 | ...... | |
|---|---|---|---|---|---|---|---|---|
| | 0 | 1 | 0 | 0 | 0 | 0 | ...... | +1) |
| | 1 | 0 | 0 | 0 | 0 | 0 | ...... | |

↑ NEEDS TO BE FORCED TO 0   ↑ ZERO DETECTION

| BIT POS. # | 16 | 15 | 14 | 13 | 12 | 11 | ...... | |
|---|---|---|---|---|---|---|---|---|
| | 0 | 1 | 0 | 0 | 0 | 0 | ...... | +1) |
| cl | 1 | 0 | 0 | 0 | 0 | 0 | ...... | |

↑ VALUE IS 0, CARRY NOT CANCELLED   ↑ ZERO DETECTION

ROUNDING MECHANISMS IN PROCESSORS

This application claims priority to S.N. 98402458.8, filed in Europe on Oct. 6, 1998 and S.N. 98402455.4, filed in Europe on Oct. 6, 1998.

FIELD OF THE INVENTION

The present invention relates to rounding techniques for arithmetic operations in processing engines.

BACKGROUND OF THE INVENTION

Conventional rounding operations require a rounding up or rounding down depending on whether a final calculation result exceeds or is less than a threshold. For example, consider a situation where calculations results from a Multiply and Accumulate unit (MAC) are rounded to a given degree of accuracy or with a predetermined number of significant digits Where a calculation result is between adjacent values at the predetermined number of significant digits, say X.Y, where X.Y is a value between X and X+1, and X is an arbitrary value at a predetermined accuracy or number of significant digits. In simple terms, a decision could be made always to round down to X or to round up to X+1. However, more typically, a rounding is made to the nearest value at the predetermined accuracy. Accordingly if the calculation result is greater than X.5, rounding is made to the next higher value, namely X+1. If the calculation result is less than X.5, rounding is made to the next lower value, namely X. This leaves, however, the question open as to how to treat a calculation result which is exactly X.5. Typically, processors have employed a solution where X.5 is either always rounded up to X+1, or alternatively rounded down to X. It will be appreciated that these rounding solutions add a bias to the overall calculation of the calculation. Although in isolation this is typically not significant, if the calculation resulting in the rounding from X.5 is computed very often, which can happen in applications where many repetitions occur, this can lead to the insignificant bias becoming significant.

According there is a need for a new approach to rounding which can provide unbiased rounding in an efficient manner. The present invention seeks to achieve this.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided an arithmetic unit for a processing engine. The arithmetic unit includes arithmetic logic for performing an arithmetic operation to generate an arithmetic result. It also includes zero anticipation logic for anticipating a logical zero on N least significant bits of the result. It further includes unbiased rounding logic for forcing a predetermined logic state (logic zero) on the (N+1)th least significant bit of the result.

Through the use of the zero anticipation logic to predict, or anticipate zeros on the N least significant bits, an embodiment of the invention is able to provide unbiased rounding without any time penalty.

In an embodiment of the invention, the zero anticipation tree includes a carry propagation tree responsive to carry results of the arithmetic logic (arithmetic circuitry) for anticipating a zero on each of N least significant bits of an arithmetic result. A zero anticipation output signal is generated. The unbiased rounding logic (unbiased rounding circuitry, for example a multiplexor) is responsive to this output signal for forcing the (N+1)th least significant bit of the result to logical zero where a logic zero is anticipated on N lowest significant bits of the result. A carry propagation tree can be configured to be at least as rapid as the carry propagation of, for example, a final adder of the arithmetic logic.

The execution unit could, by way of examples, be a Multiply and ACcumulate (MAC) unit, or a floating point unit rounding to the nearest sticky bit definition, or a fixed point unit with overflow anticipation.

In an embodiment of the invention which also provides zero anticipation, this function can also be mapped onto the carry propagation tree providing an efficient hardware implementation through sharing of the hardware between functions.

Preferably, the unbiased rounding is a selectable function, the unbiased rounding logic being selectively operable to provide this function for individual instructions.

In an embodiment of the invention, a logic stage connected between the partial product reduction tree and the final adder is responsive to the output signal from the carry propagation tree to force the (N+1)th least significant bit to logical zero. The logic stage can additionally be responsive to an unbiased rounding select signal selectively to enable forcing of the (N+1)th bit to zero.

In a particular embodiment of the invention for a 17-by-17 bit fixed point multiplier accumulator with accumulation on 40 bits, N is 16.

The partial product reduction tree of a particular embodiment of the invention is formed from a Wallace compression reduction network. For generating the partial products, a Booth partial product generation stage is also provided.

In accordance with another aspect of the invention, there is provided an integrated processing engine comprising at least one arithmetic unit as set out above. The integrated processing engine of a particular embodiment of the invention is a digital signal processor. However, the processing engine may take other forms, such as, for example, a microprocessor.

The digital signal processor finds particular application to telecommunications apparatus, for example GSM (Global System for Mobiles) apparatus where unbiased rounding is required for some computations. Accordingly, in accordance with a further aspect of the invention, there is provided a telecommunications device comprising a data input device, a display, and antenna and an integrated processing engine as set out above.

In accordance with yet a further aspect of the invention, there is provided a method for unbiased rounding in an arithmetic unit of a processing engine. The method includes:

performing an arithmetic operation to generate an arithmetic result;

anticipating a logical zero on N least significant bits of the result; and forcing a logic zero on the (N+1)th least significant bit of the result where a logic zero is anticipated on N least significant bits of the result.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 6 is a diagrammatic illustration of an example of operation of a pipeline in the processor of FIG. 1;

FIG. 12 is a Table describing a leaf node for one bit of a partial product;

FIG. 13A, 13B, 13C and 13D represent the logic of leaf nodes;

FIG. 16 illustrates saturation mode control;

FIG. 18A depicts the arrival profile for partial product reduction;

FIG. 18B illustrates a final adder;

FIGS. 20A and 20B are schematic representations of examples of structures for a zero detection mechanism;

FIG. 21 is a schematic representation of a first type of cell of the zero detection mechanism of FIG. 20B;

FIG. 22 is a schematic representation of a second type of cell of the zero detection mechanism of FIG. 20B;

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
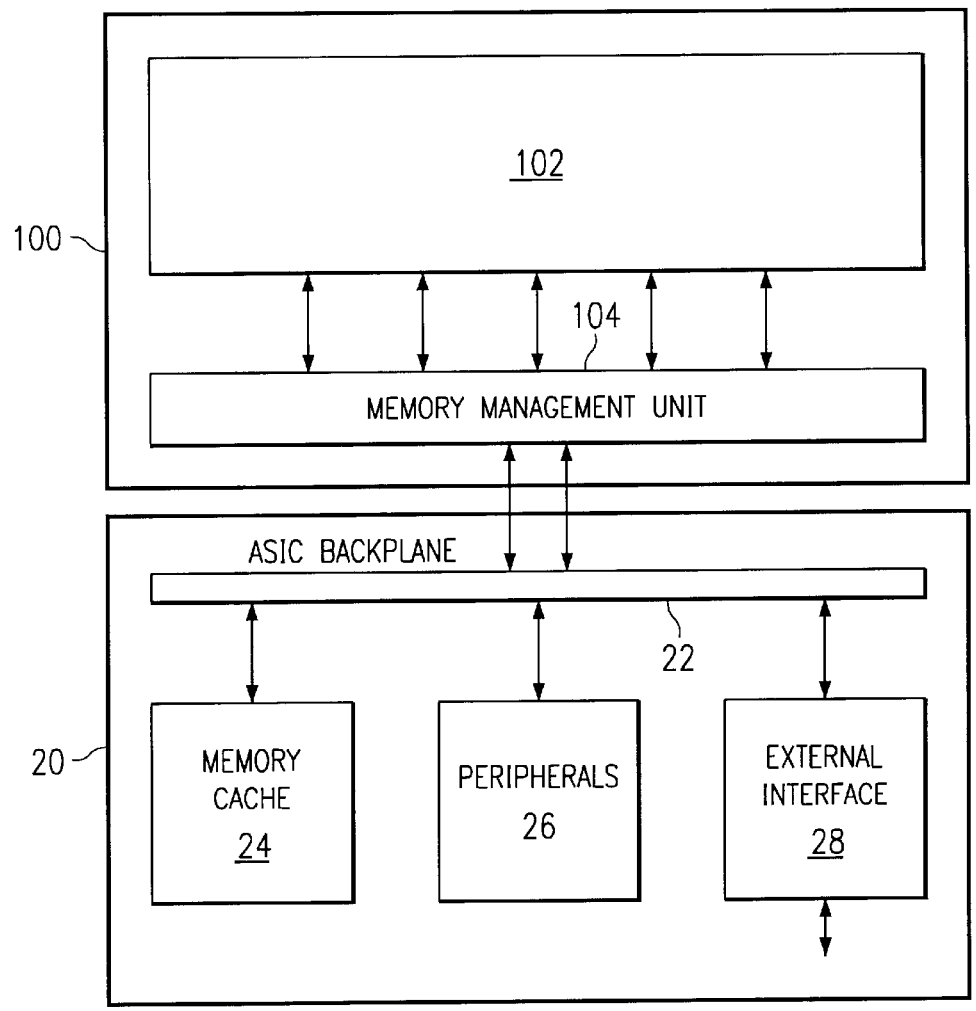
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977, which is incorporated herein by reference.

Co-related case Ser. No. 09/411,167, describes a multiplier which uses the rounding mechanism described herein, and is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
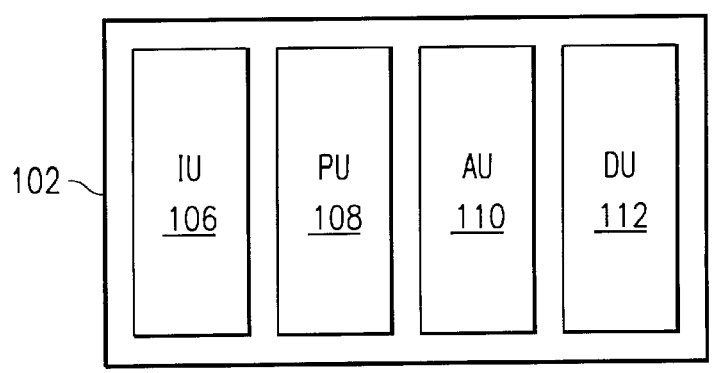
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
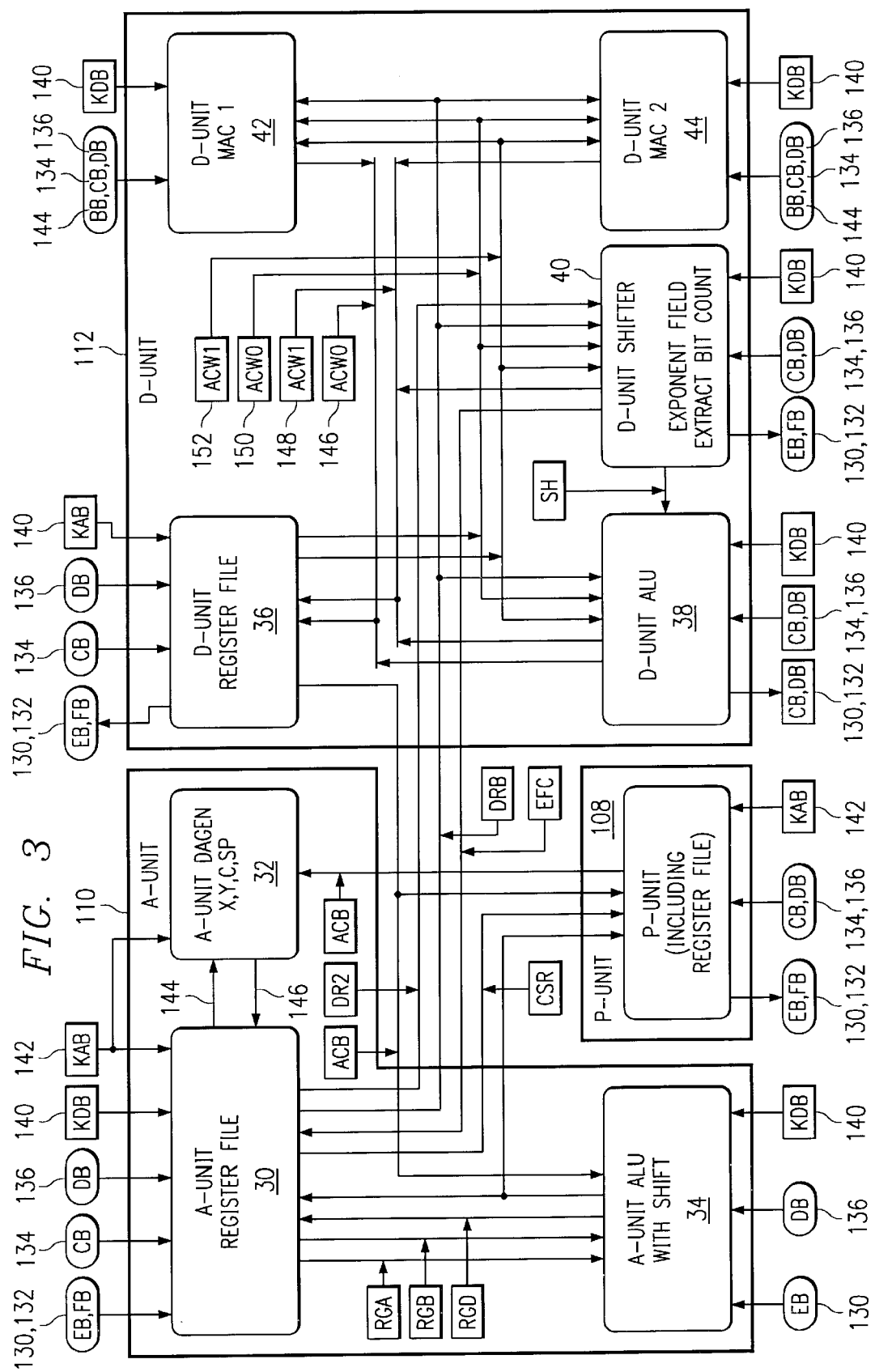
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
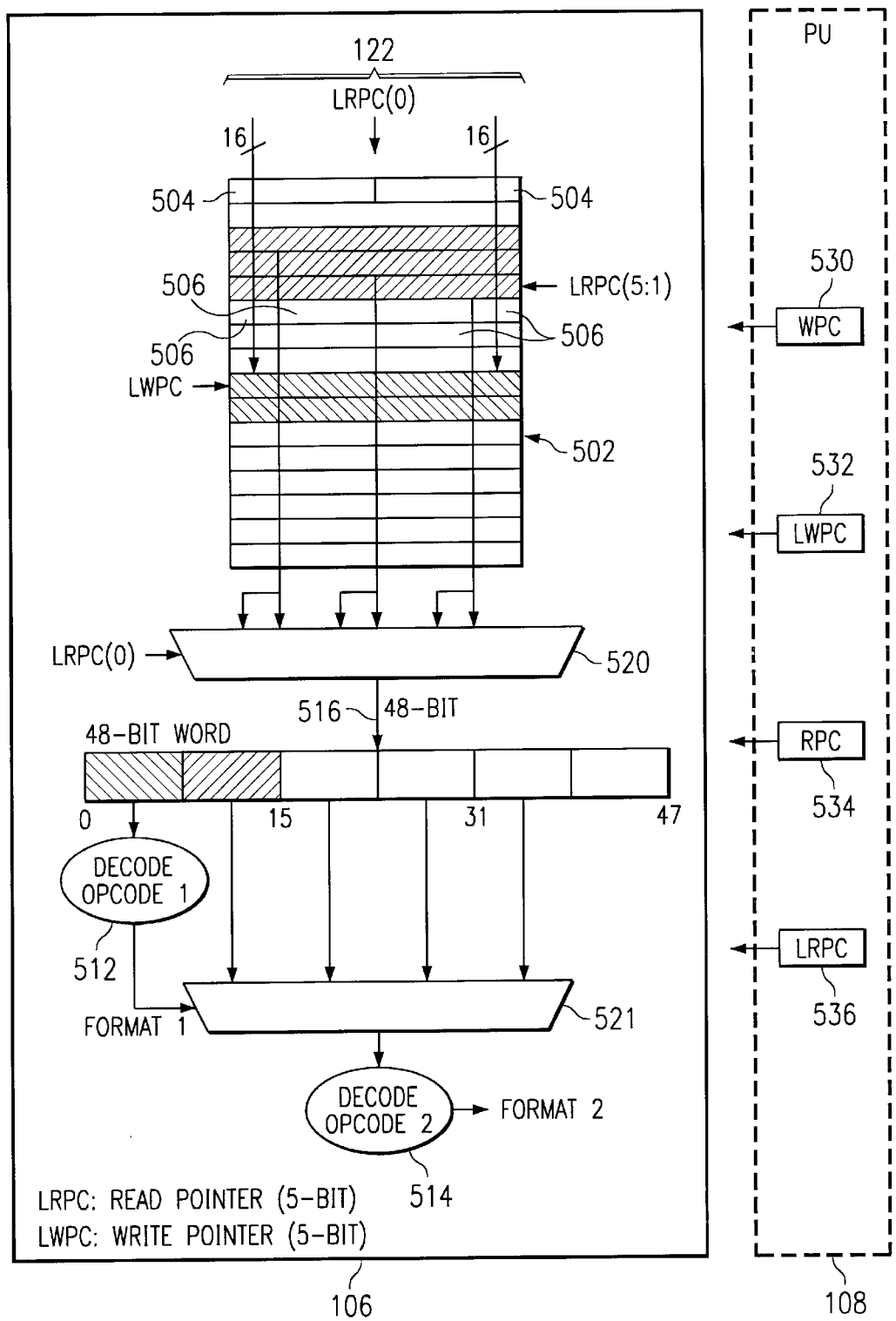
FIG. 4 is schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 5:
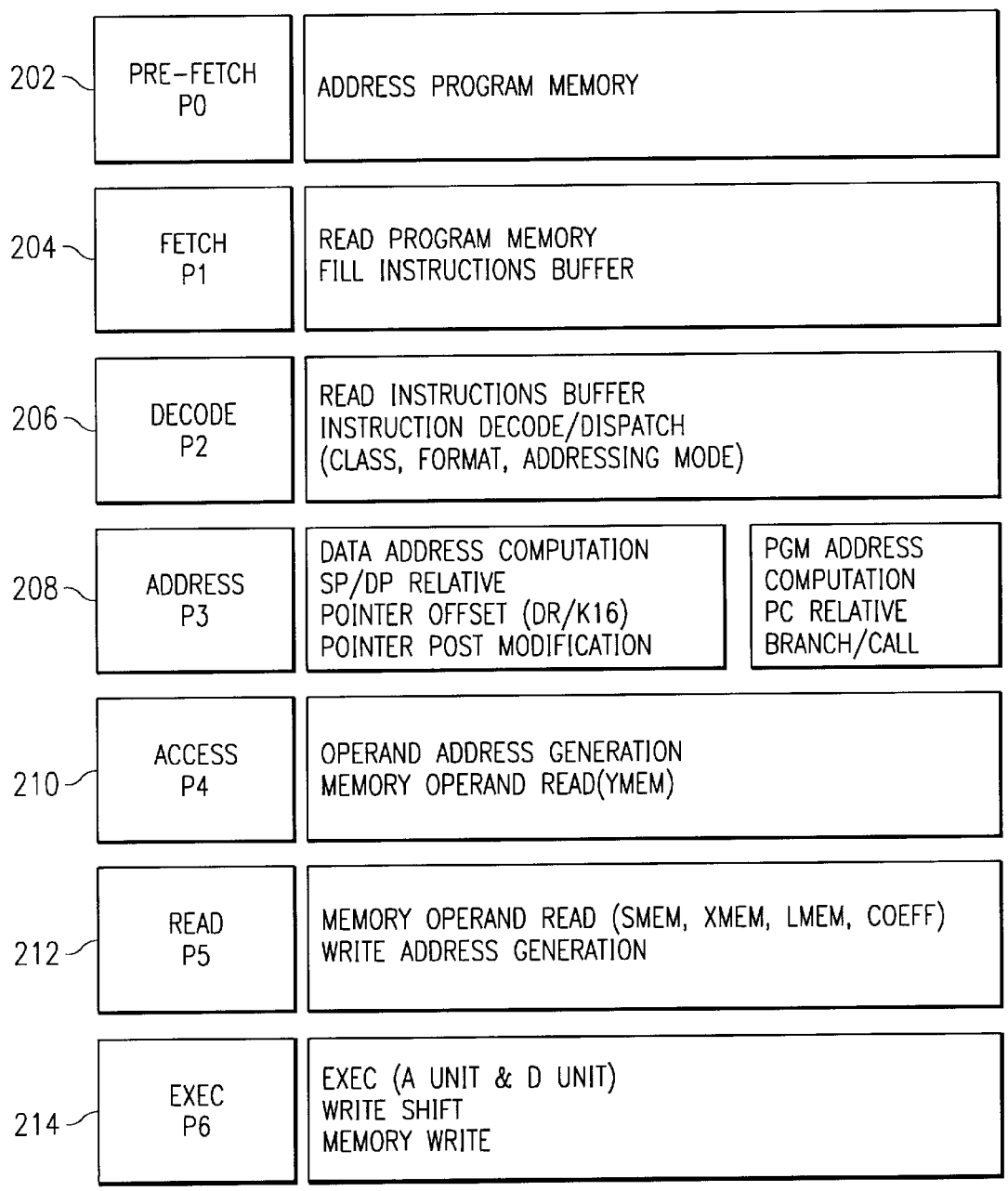
FIG. 5 is a representation of pipeline phases of the processor of FIG. 1.

The processor core 102 executes instructions through a 7 stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of 7 instructions may be processed simultaneously. FIG. 6 shows all 7 instructions 302–314 being processed in time period $T_7$. Such a structure adds a form of parallelism to the processing of instructions.

Figure 7:
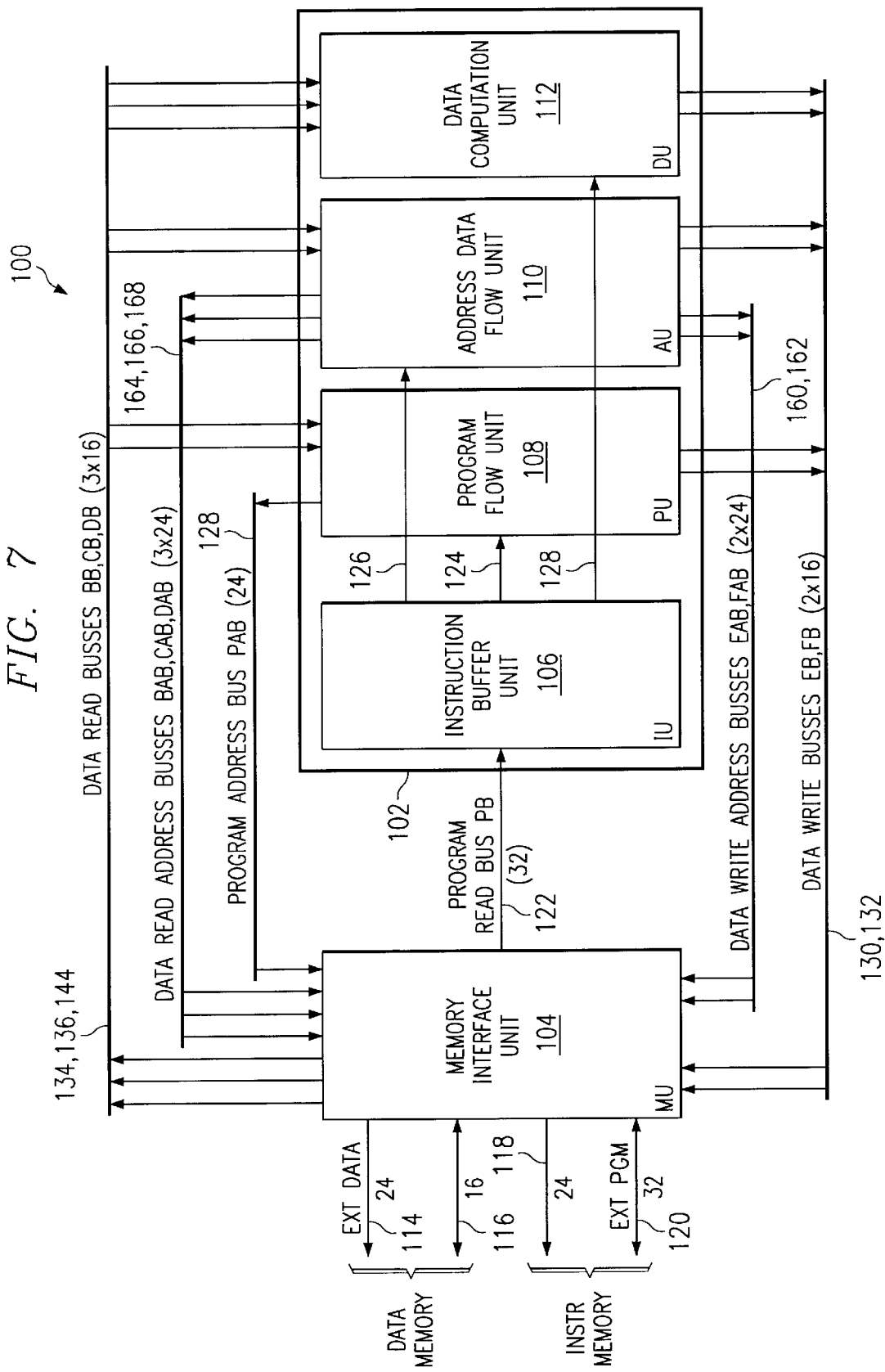
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bi-directional 16 bit data bus 116. Additionally, the memory management unit 104 is coupled to program storage memory (not shown) via a 24 bit address bus 118 and a 32 bit bi-directional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

An embodiment of the invention is described in the following with particular reference to a multiply and accumulate unit (MAC) which provides a 17×17 multiplier-accumulator with accumulation on 40 bits.

Figures 8, 10:
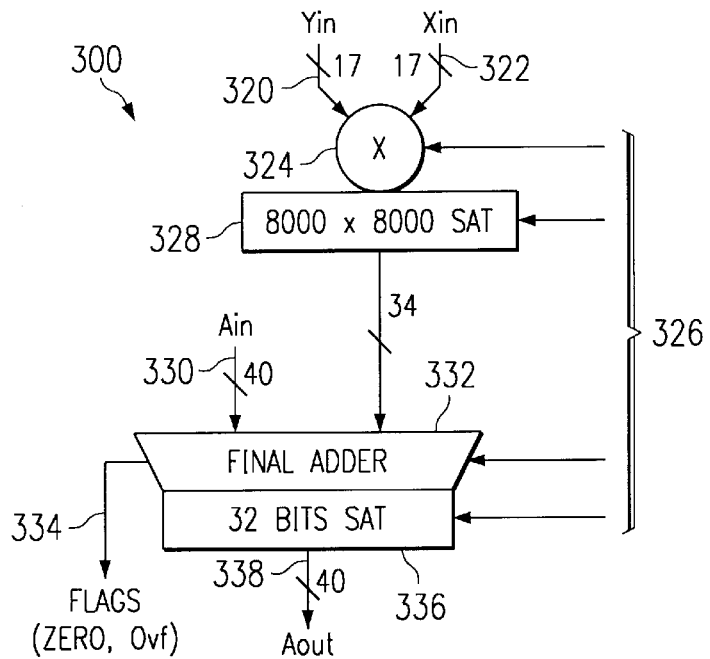
FIG. 8 is a schematic overview of a Multiply and Accumulate (MAC) unit.
FIG. 10 is a Table representing a Booth encoder.

FIG. 8 is a schematic overview of an embodiment of a MAC 300, corresponding to the MACs 42 and 44. FIG. 8 shows that the MAC provides a network of cascaded sub-blocks:

A partial product generation stage 324, which includes fractional mode control, receives first and second 17 bit operands 320 and 322 for generating partial products.

The output of the partial products generation stage passes to a partial product summing tree 328, where rounding and partial multiplication saturation control are applied.

A final adder stage 332 receives the 34 bit output of the partial product summing tree 328 and also a 40 bit Accumulator bus input (Ain) 330. The final adder stage 332 includes zero and overflow flags detection, the flags being output at 334.

Finally, a saturation stage 336 provides saturation to "0x007ffffff" or "0x7fffffffff" or "0xff8000000" or "0x8000000000" and outputs a 40 bit result and provides 16 LSBs cleared for rounding.

Control inputs 326 control the detailed operation of the MAC and control flags 334 are output by the decode unit.

Functions which can be realized by the MAC 300 are summarized in Table 1, and include the following operations: MPY—multiply operation, MAC—multiply and add to accumulator content, and MAS—subtract multiply result from the accumulator content.

TABLE 1

MPY, MAC, and MAS Operations

| FRACT | GSM | SATD | RND | MPY | MAC | MAS |
|---|---|---|---|---|---|---|
| on | off | off | off | x*(2*y) | x*(2*y) + a | a − x*(2*y) |
| off | off | off | off | x*y | x*y + a | a − x*y |
| on | on | off | off | x*(2*y) | x*(2*y) + a | a − x*(2*y) |
| off | on | off | off | x*y | x*y + a | a − x*y |
| on | off | on | off | satM40(x*(2*y)) | satM40(x*(2*y) + a) | satM40(a − x*(2*y)) |
| off | off | on | off | satM40(x*y) | satM40(x*y + a) | satM40(a − x*y) |
| on | on | on | off | satM40(x*(2*y)) | satM40(x*(2*y) + a) | satM40(a − x*(2*y)) |
|  |  |  |  | $x = y = 2^{15}: 2^{31} - 1$ | satM40($2^{31} - 1 + a$) | satM40(a − $2^{31} + 1$) |
| off | on | on | off | satM40(x*y) | satM40(x*y + a) | satM40(a − x*y) |
| on | off | off | on | mdRDM(x*(2*y)) | mdRDM(x*(2*y) + a) | mdRDM(a − x*(2*y)) |
| off | off | off | on | mdRDM(x*y) | mdRDM(x*y + a) | mdRDM(a − x*y) |
| on | on | off | on | mdRDM(x*(2*y)) | mdRDM(x*(2*y) + a) | mdRDM(a − x*(2*y)) |
| off | on | off | on | mdRDM(x*y) | mdRDM(x*y + a) | ntdRDM(a − x*y) |
| on | off | on | on | satM40(mdRDM(x*(2*y))) | satM40(mdRDM(x*(2*y) + a)) | satM40(mdRDM(a − x*(2*y))) |
| off | off | on | on | satM40(mdRDM(x*y)) | satM40(mdRDM(x*y + a)) | satM40(mdRDM(a − x*y)) |
| on | on | on | on | satM40(mdRDM(x*(2*y))) | satM40(mdRDM(x*(2*y) + a)) | satM40(mdRDM(a − x*(2*y))) |
|  |  |  |  | $x = y = 2^{15}: 2^{31} - 1$ | satM40(mdRDM($2^{31} - 1 + a$)) | satM40(mdRDM(a − $2^{31} + 1$)) |
| off | on | on | on | satM40(mdRDM(x*y)) | satM40(mdRDM(x*y + a)) | satM40(mdRDM(a-x*y)) | mdRDM( ): rounding under control of RDM flag
satM40( ): saturation under control of M40 flag In order to provide high speed, the partial product generation stage uses Booth encoding and the partial product reduction stages are implemented as a Wallace Tree structure. These techniques are described in "A suggestion for a fast multiplier" by C S Wallace, IEEE Transactions on Electronic Computers, 1964 and "A Signed Binary Multiplication Technique", by Andrew D Booth, Quarterly Journal of mechanics and Applied Mathematics, Vol. IV, part 2, 1951. More precisely, Radix-4 Booth encoding with a Wallace 4:2 based compressors reduction network is employed in the MAC 300.

In order to go from the 40-bit representation to the 16-bit one, rounding has to occur to keep accuracy during computations. Rounding is managed via the instruction set of processor core 102, through a dedicated bit field in a status register of processor 102, and via a flag called RDM. This status bit permits selection between two rounding modes. A rounding is performed on operands qualified by the rnd( ) key word in specific instructions executed in the D-unit operators (multiplication instructions, accumulator move instructions and accumulator store instructions).

The combination results in following modes when rounding (rnd) is on:
RDM=0: generates Round to+infinity, $2^{15}$ is added to the 40 bit operand and then the LSB field [15:0] is cleared to generate the final result in 16/24 bit representation where only the fields [31:16] or [39:16] are meaningful.
RDM=1: generates Round to the nearest, the rounding operation depends on LSB field range. Final result is in 16/24 bit representation where only the fields [31:16] or [39:16] are meaningful. This is a true analysis of the 16 LSBs to detect if they are in the range of:
$2^{15}-1$ to 0 (value lower than 0.5) where no rounding occurs, LSB field [15:0] is cleared.
$2^{15}+1$ to $2^{16}-1$ (value greater than 0.5) where rounding occurs by addition of $2^{15}$ to the 40-bit value and then the LSB field [15:0] is cleared.
$2^{15}$ (value equals 0.5) If the MSB field [31:16] is an odd value, then $2^{15}$ is added to the 40 bit operand and then the LSB field [15:0] is cleared. The 16 LSBs are cleared in all modes, regardless of saturation. When rounding is off, nothing is done.

Figure 9:
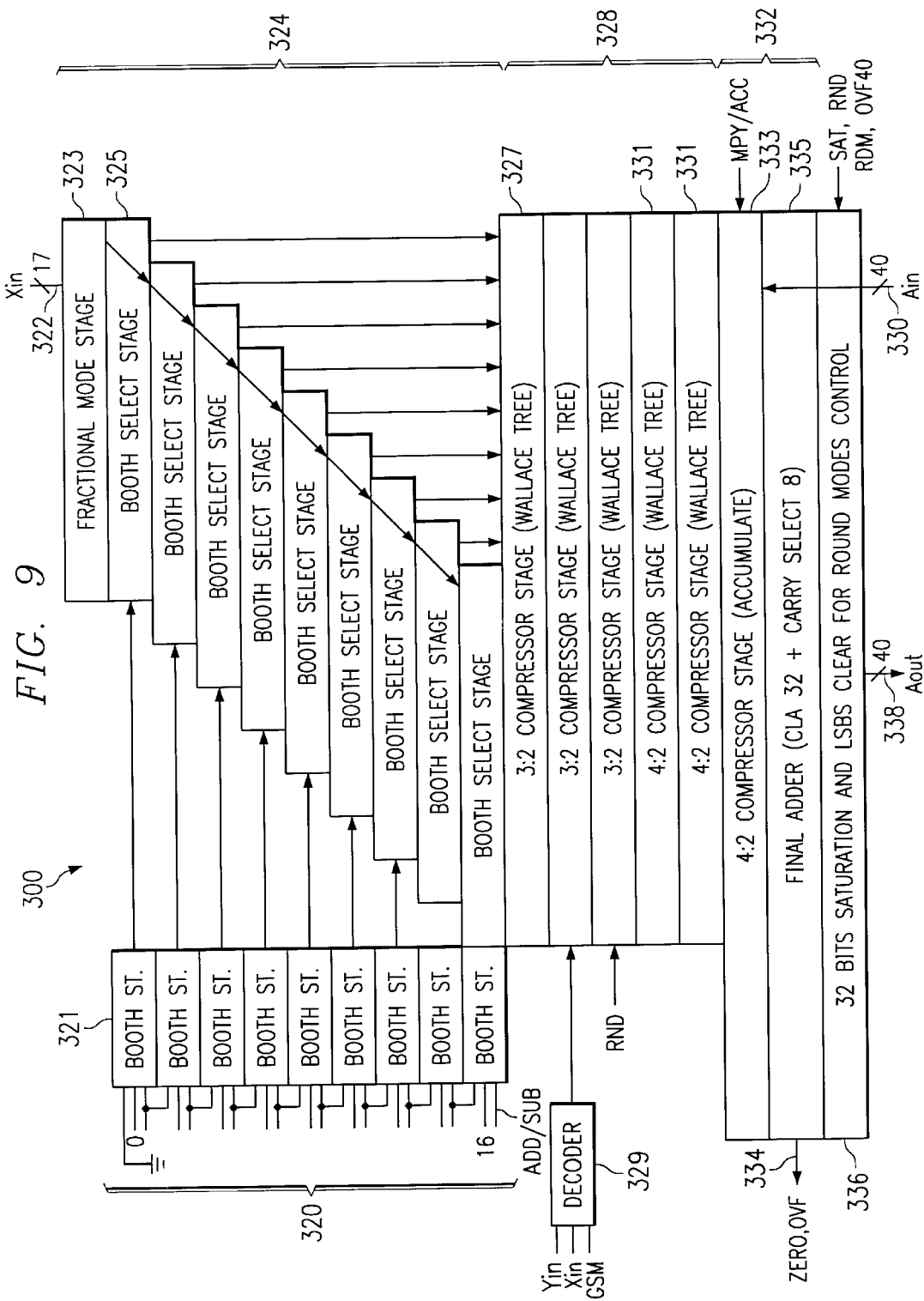
FIG. 9 shows the MAC in more detail.

FIG. 9 shows the MAC 300 in more detail.

The partial product generation stage 324 receives the X input 322 at fractional mode stage 323, and the Y input at Booth encoder stages 321. Also supplied as one input for the Booth stages is an Add/Subtract control signal (Add/sub). The partial products are then generated in a plurality of Booth select stages 325.

The partial products are supplied to the partial product summing stage 328, which comprises a number of 3:2 Wallace tree compressor stages 327 and 4:2 Wallace tree compressor stages 331. Signals including Yin, Xin, and SMUL (saturation multiply) (or GSM) signals are supplied to a decoder 329, which applies a control signal to a compressor stage 327. A rounding (RND) control signal is also supplied to a compressor stage 327.

The final adder stage 332 includes a 4:2 compressor stage 333 and the final adder itself 335. The compressor stage 333 receives the output of the last compressor stage 331. The 40 bit accumulator bus (Ain) 330 is also effectively supplied to the adder 332, as are multiply/accumulate (Mpy/Acc) control signals. Zero and Overflow flags are output at 334 from the final adder 335.

The final saturation stage 336 provides for 32/40 bits saturation and lowest significant bit clearing for rounding mode control. Saturation and rounding control signals (SAT, RND, RDM and OVF40) are supplied to the final saturation stage for rounding control). The 40 bit result Aout is output at 338.

The various stages of the MAC shown in FIG. 9 will be described in more detail in the following.

The Booth encoder stages 321 are implemented as a classical Booth encoder for dividing the number of partial products to be added. A Radix-4 encoder implements a modified Booth algorithm with 3 bits of a multiplier operand being converted to control zero Partial Product (PP) generation, multiplicand operand PP generation, multiplicand shifted by one position to the MSBs, PP generation and sign generation. FIG. 10 is a table representing the Booth encoder, where p2, p1 and sg are outputs.

The Booth encoder basic equations should be packaged in one socalled leaf cell within the encoder. Output buffering can be left out of this cell. Nine cells like this are required to encode the 17 bits of the multiplier operand. Bits are associated in the manner indicated below:

| | |
|---|---|
| '0', Y0, Y1 | first encoder, |
| Y1, Y2, Y3 | second encoder, |
| Y3, Y4, Y5 | third encoder, |
| ...., | |
| Y13, Y14, Y15 | eighth encoder. |
| Y15, Y16 | ninth encoder. |

Figure 11A:
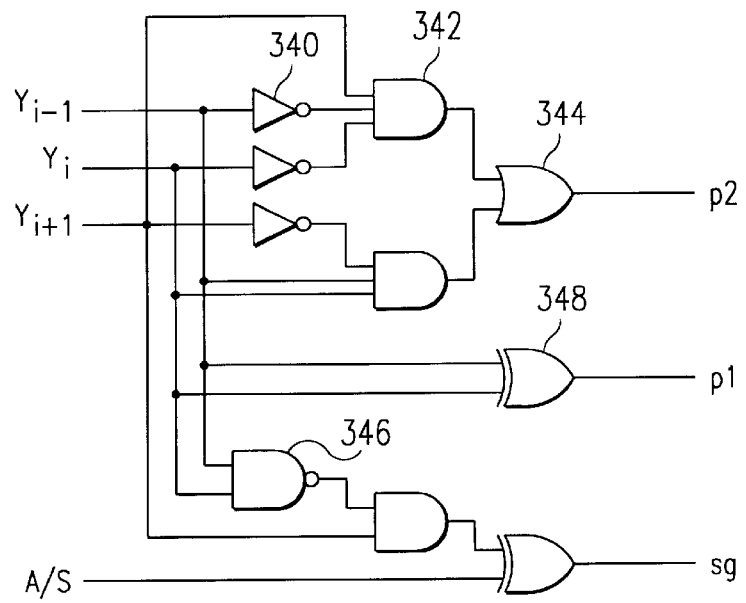
FIGS. 11A, 11B and 11C show a gate level implementation encoder stages for the Booth encoder of FIG. 10.
Figure 11B:
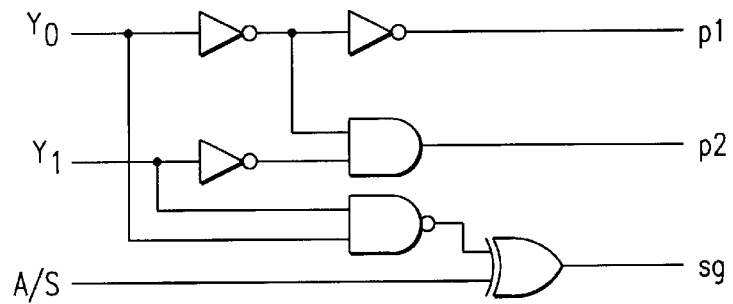
Figure 11C:
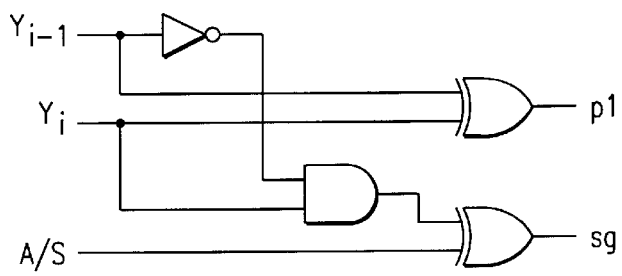

The first encoder cell is slightly different as the "000" input configuration will generate p1=p2=0 and sg=1 in order to handle saturate multiply (SMUL) mode more easily. The ninth and last encoder is also different because the last bit is a duplication of the sign bit, which simplifies its logic structure. The Add/sub signal that defines addition or subtraction of the product to the accumulator has the effect, if "multiply-and-subtract" mode is selected, of complementing the sign bit "sg" value (in the entries in the table of FIG. 10) by an XOR (exclusive OR) gate. FIGS. 11A–11C shows a gate level implementation of encoder stages, with FIG. 11A being the standard encoder (including the add/subtract (A/S function), FIG. 11B being the first encoder and FIG. 11C the modified encoder stage for last (i.e. the ninth) stage. The gate level implementations used in this specification have been drawn using conventional gate symbols and are therefore readily understandable to one skilled in the art without a detailed explanation thereof. Accordingly, a full description of the gate level implementations is not included in this specification. However, and merely by way of identifying the various gate symbols, reference is made to FIG. 11A, where symbol 340 represents a NOT (inverter) gate, symbol 342 represents an AND gate, symbol 344 represents an OR gate, symbol 346 represents a NAND gate and symbol 348 represents a XOR gate. Although not shown in FIG. 11A, a NOR gate is represented later (in FIG. 17) by a symbol 350, which is formed by the symbol 344 for an OR gate with a small circle at the output end.

It is in the partial product selection stages 325 that the partial products that will be further added together are generated. The stage consist of a multiplexor controlled by the signals "p2", "p1" and "sg" previously described. FIG. 12 is a Table describing a leaf cell that generates one bit of the partial product (PP).

"–2*X" and "–X" selections are built by inverting in corresponding X bit position and adding a Booth carry bit at position 0. The Booth carry bit is the "sg" bit value. A dedicated cell provides sign extension management. The first partial product also includes fractional mode control, as will be described later.

Figure 13C:
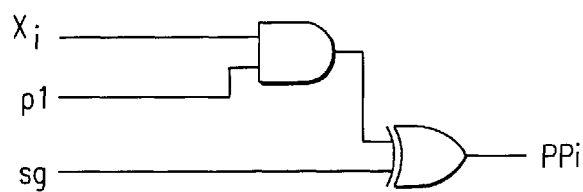
Figure 13D:
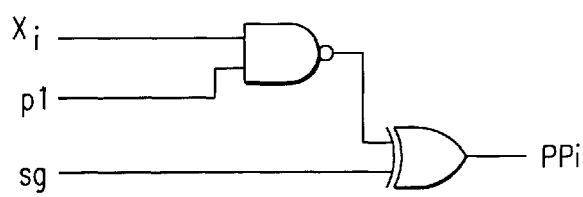

The partial products are aligned so that each is summed with the next shifted by 2 bit positions to the most significant bits. FIG. 13 shows the logic of the leaf cells. FIGS. 13A–13D represent a normal stage. FIG. 13B represents a normal stage with sign extension. FIG. 13C represents a final stage, and FIG. 13D a final stage with sign extension. It will be noted that the final stages are simpler than the normal stages.

The reduction of partial products using a Wallace tree leads to the most parallel and irregular network of compressors. In order still to keep some regularity in the implementation, a mixed scheme of 3:2 and 4:2 compressors is used. A compressor is an operator that adds together n partial product bits delivering a sum and a carry bit. A 3:2 compressor sums three bits and delivers the two bits which are further reduced in the tree. A 4:2 compressor adds four bits together with a carry input and generates two bits and a carry output to its neighbor. The total number of reduction stages is three. The first one consist of, at worst, three slices of 3:2 compressors 317 that will generate three (sum, carry) pairs per partial product bit. These pairs are further reduced by two cascaded stages of 4:2 compressors 321, finally delivering a (sum, carry) pair per partial product bit to be added in the accumulator 323.

Figure 14:
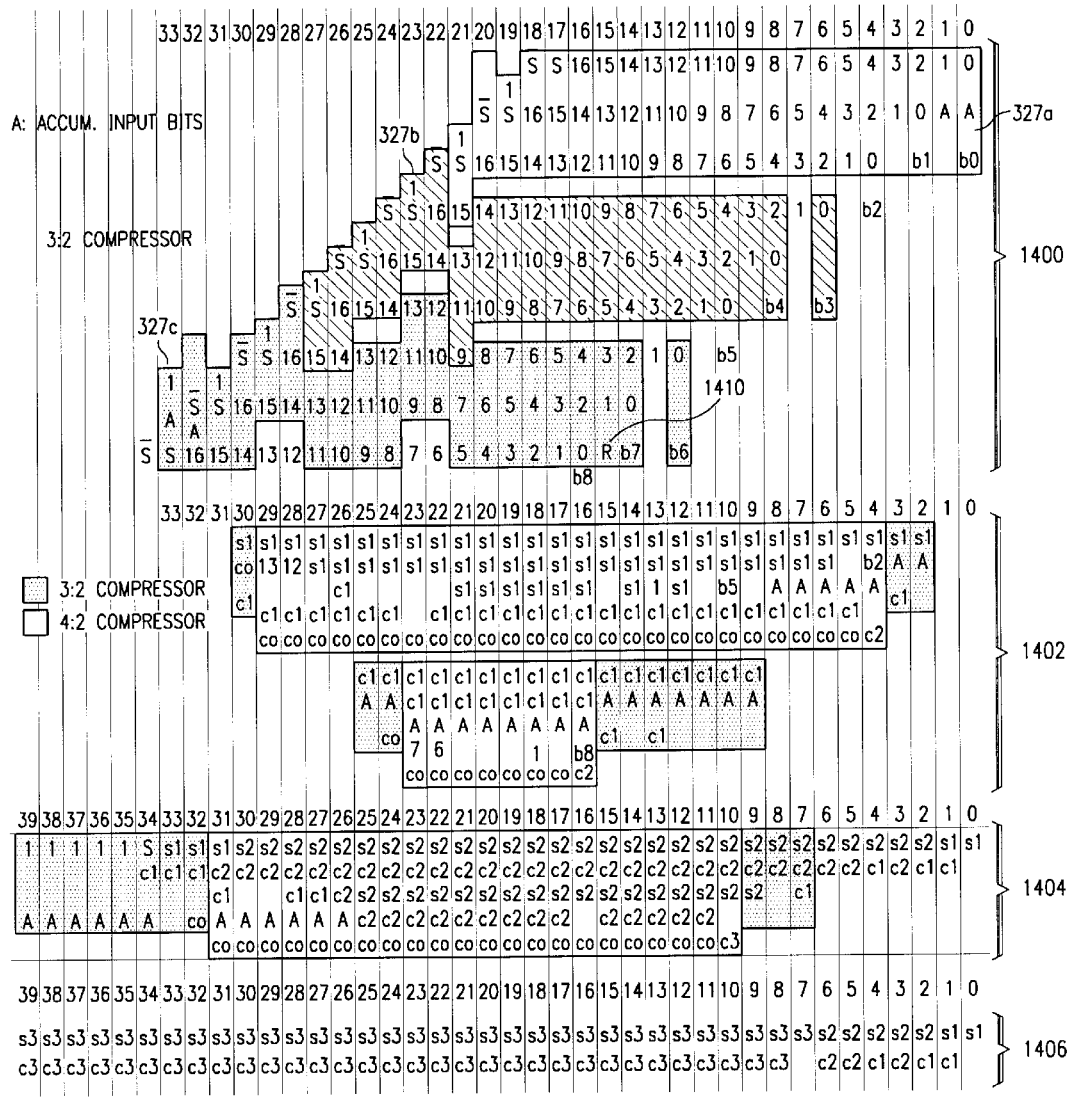
FIG. 14 illustrates partial product alignment and reduction.

FIG. 14 shows the partial products alignment and reduction using the first stage 1400 of compressors 327a–c. Sign extension overhead in number of compressors is limited via addition of ones. Booth carries are also added in this stage (b0 to b8 signals). Rounding is performed by adding a one at bit position 15 when "RND" signal is active, indicated at 1410.

Then, intermediate sum (s1) and carry (c1) bits are added together, in all bit positions, with a stage 1402 of 4:2 compressors or 3:2 compressors 331. It is followed by another stage 1404 of the same type and a stage of half adders to reduce the PPs to a vector 1406 of sum and carry bits that will be added by the final adder. FIG. 14 shows the reduction process applied to sum and carry bits issued by the network. Generally, the usage of 4:2 compressors leads to a more balanced signal arrival profile in general and at the end of the tree.

Figure 15:
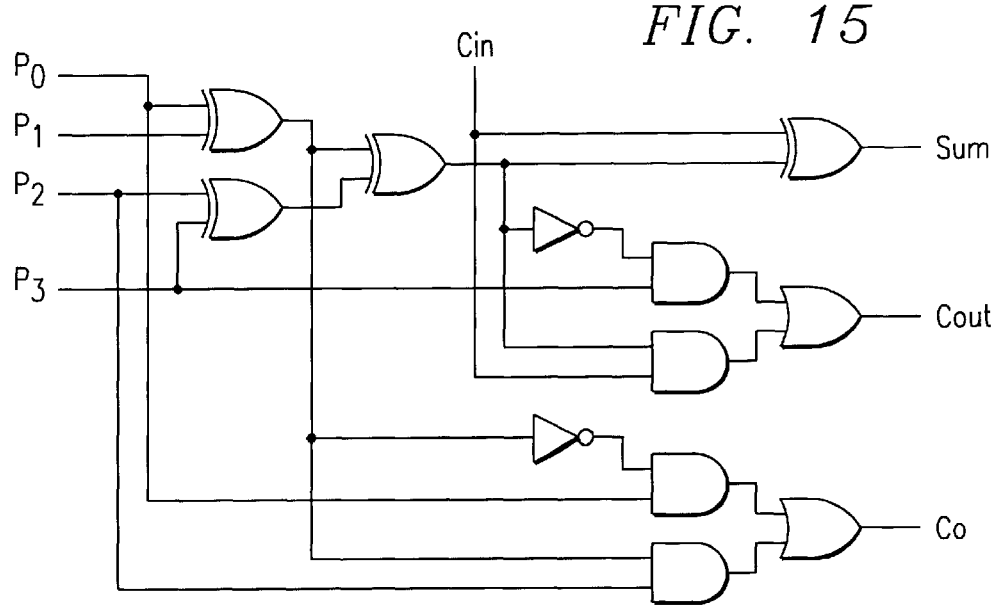
FIG. 15 illustrates the logic of a Wallace compressor stage.

FIG. 15 is a logic diagram of a cell for a 4:2 Wallace compressor stage. This cell provides a 4:2 compressor with a faster path from an input 'Pi' to an output 'Sum' and balanced paths from an input 'Cin' and an output 'Cout' and the input 'Pi' to the output 'Co'. The connection of the 4:2 compressor in the partial product reduction stage is in both horizontal (C0–C1) and vertical directions (Sum, Cout-Pi).

For 3:2 compressors, a cell performs an "a+b+1" function for equations "sum=!(a XOR b)" and "carry=a|b". This is represented by means of the truth table in Table 2.

TABLE 2

| | | a + b + 1 | |
|---|---|---|---|
| A | B | sum | carry |
| 0 | 0 | 1 | 0 |
| 0 | 1 | 0 | 1 |
| 1 | 0 | 0 | 1 |
| 1 | 1 | 1 | 1 |

A particular application of the present embodiment is in digital telecommunications devices such as GSM devices. GSM requires the saturation and fractional mode control. In this embodiment, this is achieved by shifting the Xin operand by one position towards the most significant bit. This is implemented via a 2-input multiplexor 1600 as illustrated in FIG. 16. Multiplexor 1600 is controlled by control signal FRACT.

Figure 17:
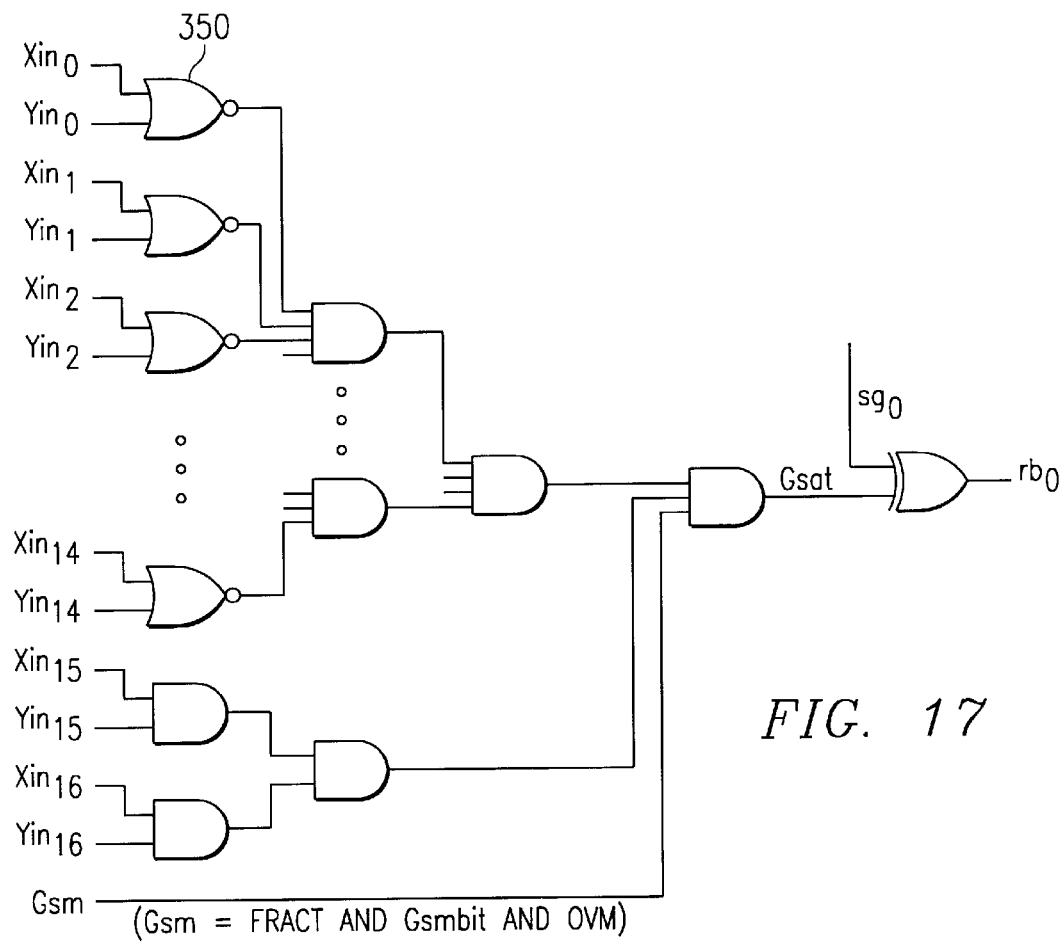
FIG. 17 illustrates logic for decoding special operands.

The SMUL saturation mode implies that if "x18000" multiplied by "x18000" appears, the result must be forced to "007fffffff" or "0080007fff" where a rounding mode is selected. Decoding of the Xin and Yin special operands is performed through standard logic gates as illustrated in FIG. 17. (As mentioned above with reference to FIG. 11A, symbol 350 represents a NOR gate). The result complements the Booth carry of the first stage in order to add all ones for the first partial product. The total decode time is not longer than the delay through the Booth encoding and partial product selection stages.

The final adder stage includes addition of the accumulator content and sums and carries reduction. These operations are performed through a stage of 3:2 compressors in order to reduce the accumulator in (Ain), sum and carry busses to a new set of sums and carries, and a 40 bit adder to get the final result which is analyzed for 32 bits saturation detection.

High speed architectures of the final adder typically requires Carry Look Ahead (CLA) techniques in various implementations. A one block CLA for 40 bits leads to a carry propagation scheme of a 64 bit adder, as regards both speed and area. Another technique based on the observation of the partial product reduction tree delay profile, allows pure CLA implementation to be limited to lower bits up to the bit position where this delay starts to decrease. For the remaining most significant bits, the carry propagation effect is reduced by choosing a carry select adder scheme where the selection is performed by the carry output of the first CLA adder. Within the carry select architecture, a delay arrival profile can be taken into account by propagating the carry with a variable carry skip. This has the advantage of reducing toggling on the higher bits of the adder while getting a smaller CLA structure.

FIG. 18A depicts the delay arrival profile for the partial product reduction, in terms of elementary full adder delays. FIG. 18B illustrates the corresponding final adder structure.

Zero detection signals are generated as described later with reference to FIGS. 19–26. Before describing zero detection, however, it is appropriate to note that a 3:2 compressor network is used to add the accumulator bus onto the extension bits, before being passed to the final adder. Sign extension is handled using the addition of ones from bit position 35 to bit position 39. The accumulator bus input value Ain[39:0] is forced to 0 if a multiply mode only is selected. So, where Ai=Ain[i].Mpy/MAC, Ai is either Ain[i] if Mpy/Mac is at logic level one or 0, otherwise.

With regard to zero detection, it is noted that when the final result, at the adder output, is zero the corresponding flag (zero detector) is set to one. If rounding mode is active, the 16 least significant bits of the result are assumed to be zero for updating the flag. As such, conventional implementations that scan the final result bits (after rounding) lead to a unacceptable increase of the total MAC critical path. In a particular embodiment of the invention, a zero anticipation mechanism, or "Zero Result Anticipation" (ZRA) mechanism, is used to update the flag in parallel with the final addition.

The zero result anticipation behavior relies on an early analysis of P, G and Z bits, at each bit position. Combinations of these bits lead to a "state machine"-like description in which states of the system are PS (Propagate State), GS (Generate State) and ZS (Zero State).

In the following, a zero detection mechanism based on a Carry Look-Ahead (CLA) adder-like structure will be described. However, before describing an implementation of the zero detection mechanism, there follows a description of the following mathematical algorithms on which the CLA architecture of the embodiment is based:

Where a and b are two operands of an addition, then:

$$g(i)=a(i) \cdot b(i) \qquad (1)$$

$$p(i)=a(i) \oplus b(i) \qquad (2)$$

In equations (1) and (2) above, "g" is a "generate term and "p" is a "propagate term. The symbol "·" represents a logical AND operation and the symbol "⊕" represents a logical Exclusive OR (XOR) operation. The "g" and "p" terms are combined to compute a carry. Indeed, c(i)=G(i)=G(i,0), if the carry in=0, where:

$$(G(i,0), P(i,0))=(g(0), p(0)), \text{ if } i=0 \qquad (3)$$

$$(G(i,0), P(i,0))=(g(i)p(i))o(G(i-1,0), P(i-1,0))$$

otherwise, and where the operator o is:

$$(g\_1, p\_1)o(g\_r, p\_r)=(g\_1+(p\_1 \cdot g\_r), p\_1 \cdot p\_r) \qquad (4)$$

In the above equation, the symbol "+" represents a logic OR operation.

It can be proven that the commutativity of the "o" operator leads to:

$$(G(n,m),P(n,m))=(G(n,k+1),P(n,k+1))o(G(k,m), P(k,m))(n>k \leq m) \qquad (5)$$

and $$(G(n,m),P(n,m))=(G(n-m,0), P(n-m,0))(n \leq m)$$

The same architecture can be used for several slices of operands, with the result of these calculations being combined to provide global carry generation, based on the 'o' operator. A slice of an operand comprises a range of bits of the operand. The degree of freedom provided by the index k in the above equation is used to slice the operand in the most efficient way, in terms of propagation delay. This is done by minimizing the global propagation time through the fast carry generator.

In order to illustrate zero detection, consider a simple example of two bit addition:

| a: | 00 | 01 | 10 |
| b: | 00 | 11 | 10 |
| p: | 00 | 10 | 00 |
| g: | 00 | 01 | 10 |

It should be noted that the terms a and b may be exchanged. In order to generalize this to n-bit addition, a new zero term (equation 8 below) is defined and can be combined with equations (1) and (2) above to form a set of three equations (6), (7) and (8) for defining a p(i) bit, a g(i) bit and zero(i) bit, respectively:

$$g(i)=a(i) \cdot b(i) \qquad (6)$$

$$p(i)=a(i) \oplus b(i) \qquad (7)$$

$$zero(i)=\sim(a(i)+b(i)) \qquad (8)$$

The representation "~(a(i)+b(i))" indicates the complement of "(a(i)+b(i))".

Figure 19:
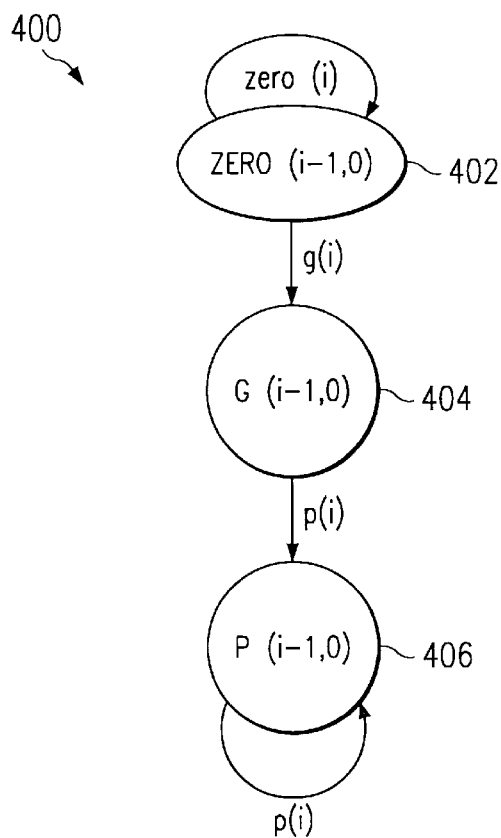
FIG. 19 is a state machine of a zero result anticipation mechanism.

A combination of the definitions of the three bits as defined in equations as set out at (6), (7) and (8) above leads to a state machine definition 400 of a zero anticipation mechanism as illustrated in FIG. 19, in which the states of the system are:

$$ZERO(i, 0) = State\ zero\ (402)$$

$$G(i, 0) = State\ generate\ (404)$$

$$P(i, 0) = State\ propagate\ (406).$$

Equations for defining the states ZERO(i,0), G(i,0) and P(i,0) are:

$$ZERO(i, 0) = zero(i)\ ZERO(i-1, 0) \qquad (9)$$

$$G(i, 0) = g(i)\ ZERO(i-1, 0) \qquad (10)$$

$$P(i, 0) = p(i)\ (G(i-1, 0) + P(i-1, 0)). \qquad (11)$$

Thus, a zero (Z) is detected on bit i, if one of these three states is found.

$$Z(i,0) = \text{ZERO}(i,0) + G(i,0) + P(i,0) \quad (12)$$

In other words, this means that the addition of two operands results in a zero if a state is produced such that an index k ($0 \leq k \leq n$) is found so that:

$$p(n-1) \ldots p(k-1)g(k)\text{zero}(k-1) \ldots \text{zero}(0) \text{ if } (0 \leq k \leq n) \quad (13)$$

To provide zero detection using the fast carry generation architecture described above, an operator is defined with the same properties as the operator "o". This can be derived from the equation (13) above. Indeed, two operand slices (n,k+1) and (k,m) each result in a zero if they have the property described in equation (13) above. A zero will be detected on a slice (n, m) in the two following cases:

the state of the (k,m) slice is all zeros (A)

the state of (n,k+1) is a zero_detect (i.e. the same as one of the states at (12)) (B)

or the state of (k,m) is a zero_detect and the slice contains a "g" (C)

the state of (n,k+1) is all p's (D)

This leads to the following equation:

$$Z(n, m) = \underbrace{((Z(k, m)}_{(A)} \text{ and } \underbrace{\sim G(k, m) \text{ and } Z(n, k+1))}_{(B)} \text{ or} \quad (14)$$

$$\underbrace{Z(k, m) \text{ and } G(k, m)}_{(C)} \text{ and } \underbrace{P(n, k+1))}_{(D)}$$

where $Z(i,i) = g(i) + \text{zero}(i)$.

Also, the G(i,j) and P(i,j) terms can be taken from the adder fast-carry generation intermediate results. Thus, the zero-detection mechanism achieved by modifying the "o" operator in the following way to form a "u" operator which is defined as $(g\_1, p\_1, z\_1)u(g\_r, p\_r, z\_r) = (g\_1 + (p\_1 \cdot g\_r), p\_1 \cdot p\_r, (z\_1 \cdot r \cdot (\sim g\_r)) + p\_1 \cdot z\_r \cdot g\_r)$ Using these equations, cells can be created that are optimized both for layout implementation and performance. These cells are optimized for CMOS technology which invert signals.

Figure 20A:
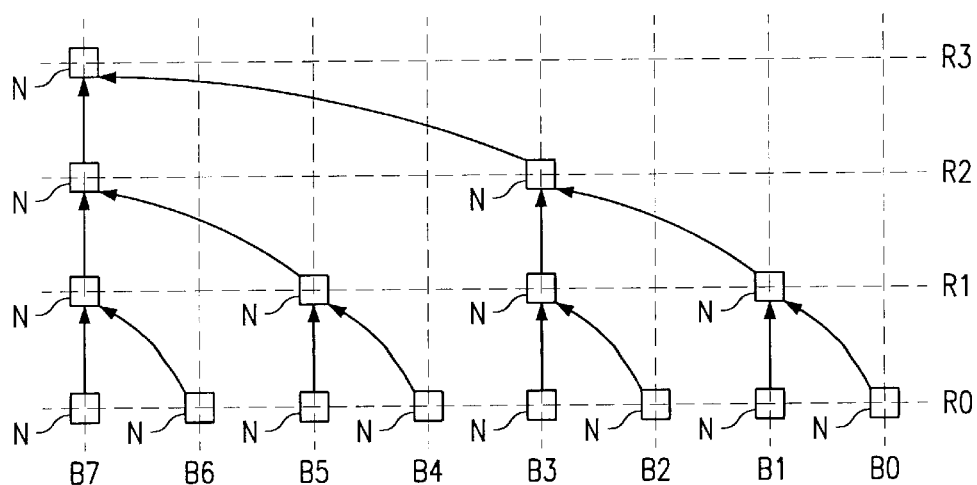

FIG. 20A is a schematic representation of an approach to implementing a zero anticipation mechanism in the form of time optimal adder comprising a binary tree of nodes N based on the principles set down in the above equations. The arrows joining the nodes represent the propagation of intermediate zero signals. FIG. 20A illustrates this structure for 8 bit positions B0–B7. However, it will be apparent from FIG. 20A how this can be extended to any number of bit positions.

FIG. 20B is a specific exemplary implementation for such a time optimal adder for 5 bits (e.g. bits B0–B4 of FIG. 20A). This includes an array of cells C(i,j), with cells CC, implementing the operator "u" for combining intermediate anticipation signal, and cells CB for forwarding intermediate anticipation signals between the cells CC. In parentheses are slice boundaries (i,j). A slice boundary is the boundary between slices. Each column in FIG. 20B represents a bit position with the bit positions increasing from a lowest significant bit position on the right to successively higher bit positions towards the left.

As illustrated in FIG. 20B, the array for a 5-bit operation is sliced into a first sub-array 408 for a 2-bit operation and a second sub-array 410 for a 3-bit operation, and that the global result is obtained by combining the two intermediate results via the "u" operator (e.g. (4,4) u(3,2)=(4,2)).

Inputs for bits B0–B4 are supplied to cells of the first row 412. The intermediate anticipation signals ripple upwards through the second row 413 and the third row 414 and towards the left as indicated by the arrows. The signals pass from one row to the next with a delay corresponding to the time taken for the combining of the intermediate results, but pass horizontally without delay. The intermediate anticipation result from the first 2-bit operation 408 is generated at the cell 415 and is supplied to the third row 414 of cells of the three bit operation to form the global result at a vertical output from the cell 416.

The principles employed correspond to those employed in the binary tree of FIG. 20A. The first row 412 in FIG. 20B corresponds to row R1 in FIG. 20A. The cells CC of FIG. 20B effectively correspond to the nodes N of FIG. 20A. It will be noted that the distribution of the cells CC in the columns for bits B2, B3 and B4 and the rows 413 and 414 of FIG. 20B differs from that of the nodes N in the columns for bits B2, B3 and B4 and the rows R2 and R3 of FIG. 20A. This is due to the slicing of the 5-bit adder array of FIG. 20B into the 2 bit and 3 bit sub-arrays 408 and 410. Although an implementation of a 5-bit adder is depicted in FIG. 20B, using the principles set out above and the illustrations in FIGS. 20A and 20B, it will be apparent how this can be extended to provide a time optimal adder for a zero anticipation mechanism for any desired number of bits.

It can be shown that the carry_in does not affect the carry generation architecture described above, and can be taken into account at the very end of the calculation. This can be demonstrated by recurrence in the CLA adder:

1) the carry out from the first 1-bit slice is:

$c(0) = G(0,0) + P(0,0) \cdot \text{carry\_in}.$

2) Assuming that i exists, such that $c(i) = G(i,0) + P(i,0) \cdot \text{carry\_n}$.

$$\begin{aligned} c(i+1) &= g(i+1) + p(i+1) \cdot c(i) \\ &= g(i+1) + p(i+1) \cdot (G(i, 0) + P(i, 0) \cdot \text{carry\_in}) \\ &= g(i+1) + p(i+1) \cdot G(i, 0) + p(i+1) \cdot P(i, 0) \cdot \text{carry\_in} \\ &= (g(i+1) + p(i+1) \cdot G(i, 0)) + (p(i+1) \cdot P(i, 0)) \cdot \text{carry\_in} \\ &= G(i+1, 0) + P(i+1, 0) \cdot \text{carry\_in} \end{aligned}$$

Thus, the impact of the carry_in on the final result can be computed after the fast_carry generation scheme. This property is also true for zero detection. Indeed if carry_in=0, then a zero is detected if the property in equation (13) is verified, and if carry_in=1, a zero is detected if the n-bit state is all p's.

This results in the equation:

zero_detect=~carry_in·Z(n−1,0)+carry_in·P(n−1,0).

The final result of the zero detection can be supplied to enable anticipation of a zero result and to provide early indication of the result of, for example, condition codes evaluation.

FIG. 21 illustrates the inputs and outputs for one of the cells CC(i,j) 420 which are shown as a closed box in the FIG. 20B. This type of cell implements the "u" operation, and, in the general case, has the following inputs and outputs, both vertically and horizontally:
Vertical input (422): p__r, g__r, z__r
Horizontal input (424): p__1, g__J, z__1
Horizontal output (426): p__1, g__1, z__1
Vertical output (428): P, G, Z=(p__r, g__r, z__r)u(p__1, g__1, z__1)

It can be seen that a horizontal input 424 (if present) is simply passed to the horizontal output 426. This is performed without modification and without delay, so that the output signal is available substantially at the time the input signal is available. It can also be seen that the vertical output 428 is a combination, as defined by the operator "u" of the vertical input 422 and the horizontal input 424. This process does take a certain time, so that the vertical output 428 is available shortly after the vertical and horizontal inputs 422, 424 are available. The individual cells need not have a full set of inputs and outputs depending upon its position in the array, as shown in FIGS. 20A–20B.

FIG. 22 illustrates the inputs and outputs for one of the cells CB(i,j) 430 which are shown as an open box in FIG. 20B. This type of cell simply forwards signals from inputs to outputs of the cells, as illustrated below:
Vertical input (432): p__r, g__r, z__r
Horizontal output (436): p__1, g__1, z__1=p__r, g__r, z__r
Vertical output(438): p__r, g__r, z__r The horizontal output signals (p__1, g__1, z__1) at 436 are copies of the vertical input signals (p__r, g__r, z__r) from 432, which have been "amplified" by a buffer. The vertical output signals (p__r, g__r, z__r) at 438 are the vertical input signals (p__r, g__r, z__r) from 432, which have been "amplified" by a buffer. A vertical input 432, if present, is passed to the horizontal and vertical outputs, 436 and 438 although the output is delayed with respect to the input by an amount corresponding to the delay involved in generating a combination signal in one of the combining cells CC 420. It will be noted that the individual cells CB 430 have vertical inputs and horizontal and/or vertical outputs depending upon the position in the array, as shown in FIG. 20B.

The delay in the vertical direction provided by the buffer cells is needed in order that propagation of the signals in the upward direction in FIG. 20B runs in parallel in each column. The horizontal propagation is effectively immediate, so that a result is available at the vertical output (where provided) of the last cell in the vertical direction (i.e. the topmost cell as shown in FIG. 20B) for each bit position.

As described above, the example shown in FIG. 20B is effectively split into two sub-arrays, with intermediate anticipation signals propagating to the left and upwardly via the various cells in each sub-array, with the output of the first sub-array being combined with the output of the second cell in the third row (i.e. the topmost row of cells).

The intermediate anticipation signals of the operation of the five bit example of FIG. 20B operation are shown in Table 3, where rows A & B represent two 5-bit input values.

TABLE 3

| | | | | | |
|---|---|---|---|---|---|
| A | 1 | 1 | 0 | 0 | 1 |
| B | 0 | 0 | 1 | 1 | 1 |
| p__in | 1 | 1 | 1 | 1 | 0 |
| g__in | 0 | 0 | 0 | 0 | 1 |
| z__in | 0 | 0 | 0 | 0 | 1 |
| stage 1 | P (4,4) = 1 | P (3,2) = 1 | P (2,2) = 1 | P (1,0) = 0 | P (0,0) = 0 |
| | G (4,4) = 0 | G (3,2) = 0 | G (2,2) = 0 | G (1,0) = 1 | G (0,0) = 1 |
| | Z (4,4) = 0 | Z (3,2) = 0 | Z (2,2) = 0 | Z (1,0) = 1 | Z (0,0) = 1 |
| stage 2 | P (4,2) = 1 | P (3,2) = 1 | P (2,2) = 1 | P (1,0) = 0 | P (0,0) = 0 |
| | G (4,2) = 0 | G (3,2) = 0 | G (2,2) = 0 | G (1,0) = 1 | G (0,0) = 1 |
| | Z (4,2) = 0 | Z (3,2) = 0 | Z (2,2) = 0 | Z (1,0) = 1 | Z (0,0) = 1 |
| stage 3 | P (4,0) = 0 | P (3,0) = 0 | P (2,0) = 0 | P (1,0) = 0 | P (0,0) = 0 |
| | G (4,0) = 1 | G (3,0) = 1 | G (2,0) = 1 | G (1,0) = 1 | G (0,0) = 1 |
| | Z (4,0) = 1 | Z (3,0) = 1 | Z (2,0) = 1 | Z (1,0) = 1 | Z (0,0) = 1 |
| sum | 0 | 0 | 0 | 0 | 0 |
| zero | 1 | 1 | 1 | 1 | 1 |

As, in many applications, the intermediate zero anticipation detection results, which are available for the various bit positions in the top row of cells, are not needed. In such cases, the top left cell alone (in FIG. 20B, cell CC(4,0)) can be kept as an "u" operator, with one or more of the remaining cells in that row (where the intermediate results are not needed) being replaced by "o" operators, so as to avoid unnecessary logic and improve overall performance. However, "u" operator cells can also be provided at specific bit positions where intermediate zero anticipation results are needed for intermediate bit positions in an embodiment.

Figure 23:
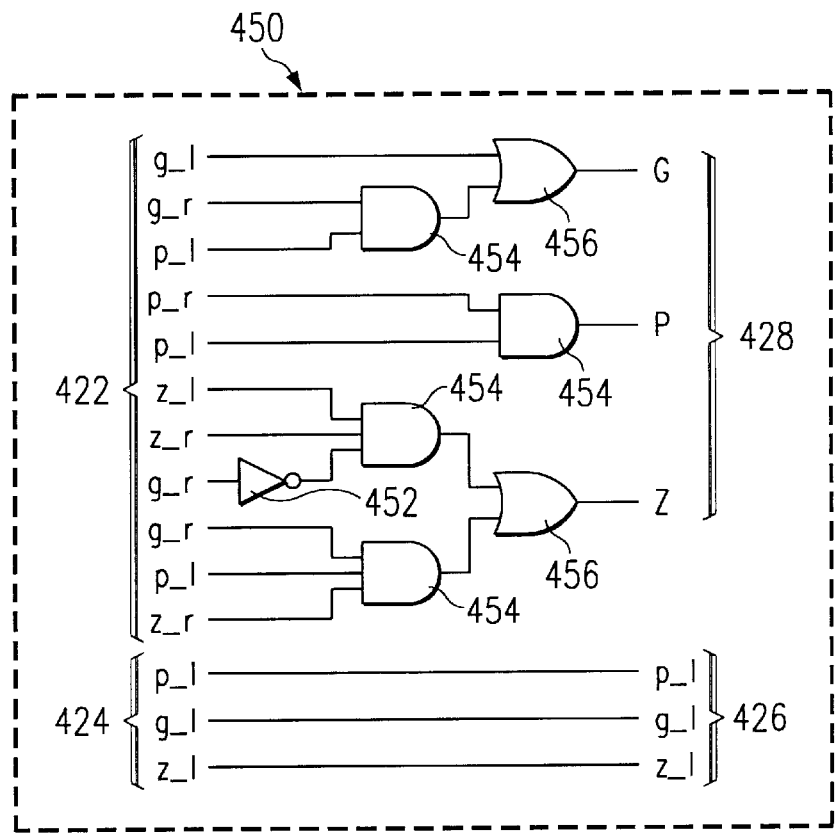
FIG. 23 is an example of logic for implementing the first type of cell of FIG. 21.

FIG. 23 is a schematic block diagram of an example of circuitry 450 including logic gates for implementing the "u" operator in one of the "CC" cells 420 of FIG. 21. In this diagram, the inputs 422 and 424 shown in FIG. 21 are provided at the left side of the Figure, and the outputs 426 and 428 are shown at the right hand side. As can be seen in FIG. 23, the circuitry for the operator includes one NOT gate 452, four AND gates 454 and two OR gates 456. It can be seen that the gates implement the operator "u". It will, however, be appreciated that other gate structures could be used to implement the operator "u" in other embodiments.

Figure 24:
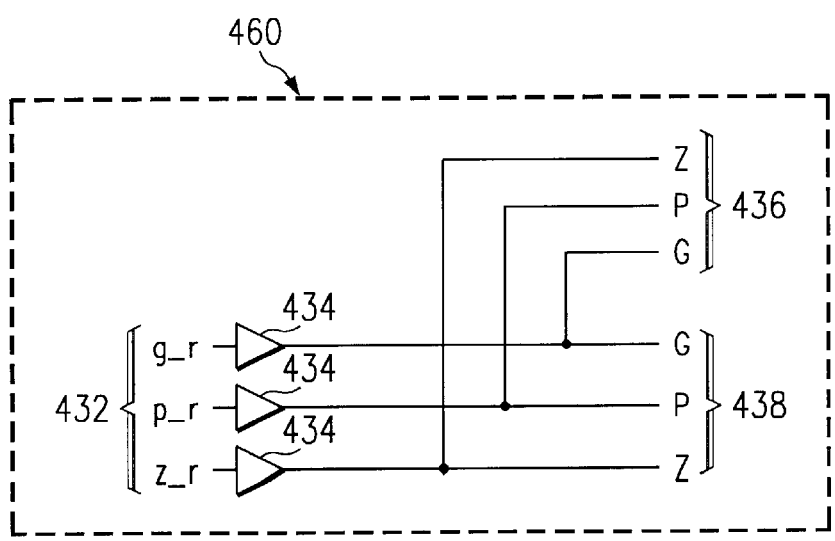
FIG. 24 is an example of logic for implementing the second type of cell of FIG. 22.

FIG. 24 is a schematic block diagram of an example of circuitry 460 for implementing one of the buffer cells CB of FIG. 22. In this diagram, the vertical inputs 432 shown in FIG. 24 are provided at the left hand side of the Figure and the horizontal and vertical outputs 436 and 438 are shown at the right hand side. As can be seen in FIG. 24, the circuitry includes three buffer (delay) circuits 434, one for each of the g__r, p__r and z__r inputs 432. The delay factor of the buffer circuits is selected to match the delay imposed by the circuitry for performing the "u" operation. The outputs from the buffer circuits 434 are supplied to the horizontal and/or vertical outputs 436 and 438, depending on the position of the buffer cell CB in the array illustrated in FIG. 20.

Figure 25:
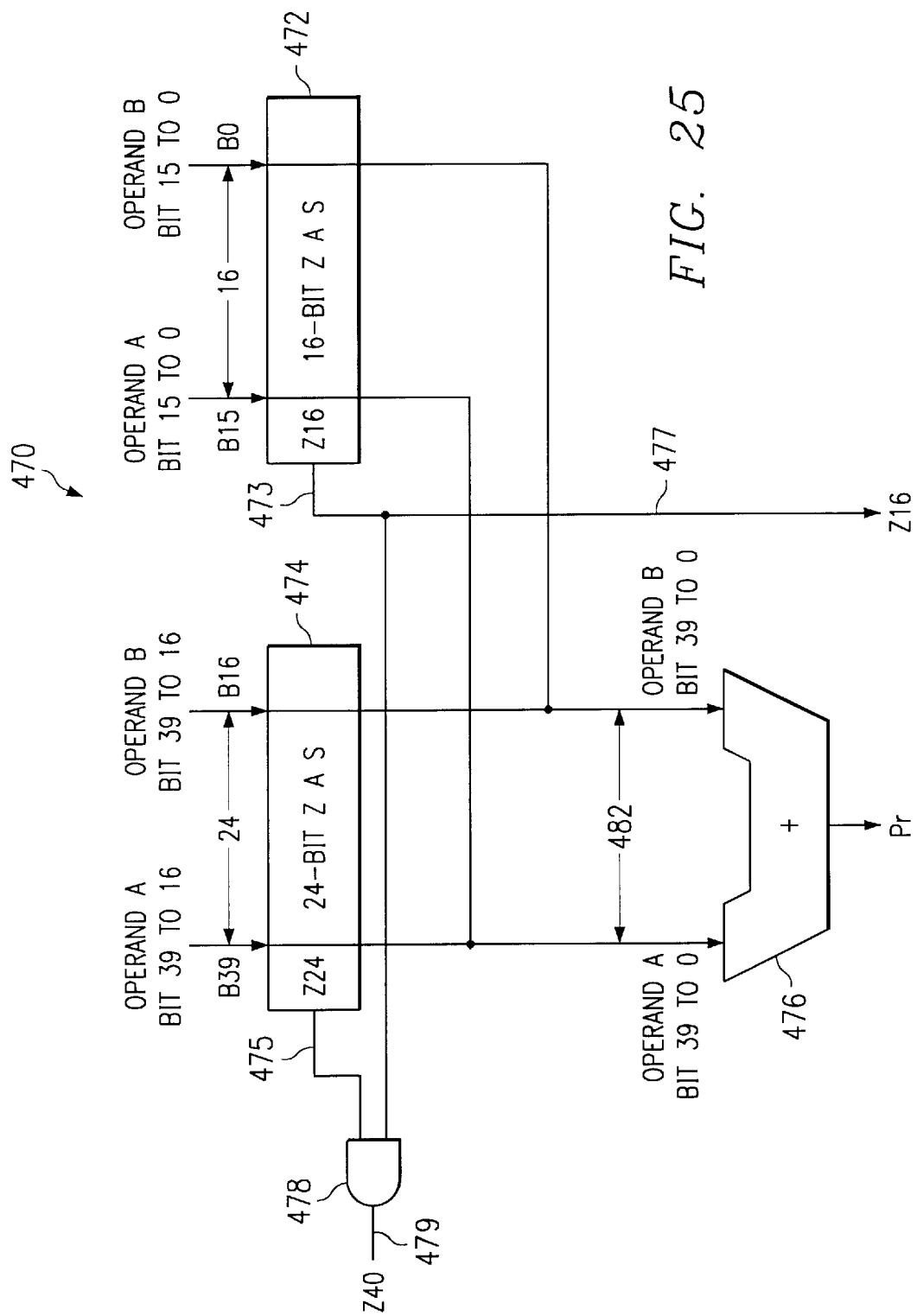
FIG. 25 is a schematic block diagram representing another example of a zero detection mechanism according to the invention.

FIG. 25 is a schematic block diagram of an example application of the zero look-ahead mechanism of FIGS. 20A/20B to a forty-bit final adder stage 470 of a multiply and accumulate unit, such as the MACs 1 and 2 (42,44) shown in FIG. 3. In this example, zero anticipation is required at forty bits and also at sixteen bits. In FIG. 25, a first zero anticipation stage 472, provides a zero anticipation output based on 16 bits B0–B15 supplied to it. These sixteen bits B0–B15 for which signals are supplied correspond to the sixteen lowest order bits of the arithmetic unit result. The arithmetic result bits are also supplied to the saturation stage 476 of the MAC. The zero anticipation result signal 473 on 16 bits is output at 477. It is also supplied to a logical AND gate 478 where the signal is added to a partial zero anticipation result signal 475 from a second zero anticipation stage 474. The second zero anticipation stage 474, provides a zero anticipation output based on signals for 24 bits supplied to it. The twenty four bits for which signals are supplied correspond to the twenty four highest order bits B16–B39 of the forty bit arithmetic unit result. The arithmetic result bits B16–B39 are also supplied to the final adder stage 335 of the MAC, the output of the final adder stage comprising the product Pr.

By combining the 16 bit zero anticipation result signal with the 24 bit zero anticipation result signal in the AND gate 478, a global zero anticipation result signal 479 on 40 bits can be generated at the output of the AND gate 478.

Figure 26:
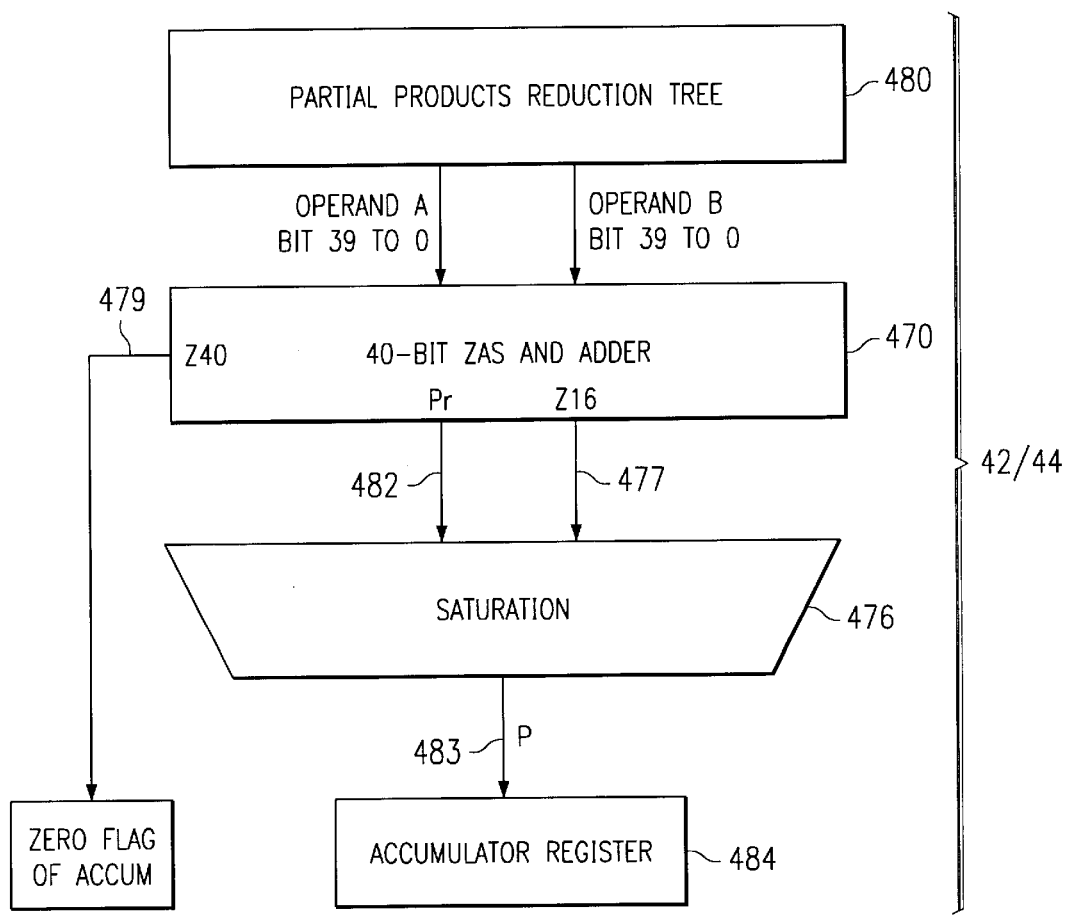
FIG. 26 is a schematic block diagram illustrating the implementation of the zero detection mechanism in the MAC of FIG. 8.

FIG. 26 illustrates in more detail the connection of the zero anticipation mechanism of FIG. 25 in a MAC (e.g. the MAC 42 or the MAC 44 of FIG. 3). The outputs from a partial product reduction tree 480 of the MAC is supplied to the forty bit final adder and zero anticipation mechanism 470. The outputs of the final adder and zero anticipation mechanism comprise the global zero anticipation flag 479 for the final result on forty bits, the result of the final adder 482 and the 16th bit zero anticipation flag 477. The results from the final adder 482 and the 16th bit zero anticipation flag 477 are supplied to saturation and rounding stage 476 of the MAC, from which the output 483 is supplied to an accumulator register.

In the final 32/40 bit saturation stage, overflow for extension bits (Add[39:32]) is detected and the final result is forced to a maximum of 32 bits representation ("0x7fffff" or "0x80000000"), or 40 bits representation ("0x7fffffffff" or "0x8000000000"), if the saturation mode is on. Actual clearing of 16 least significant bits is also performed if the rounding mode is active.

Figure 27:
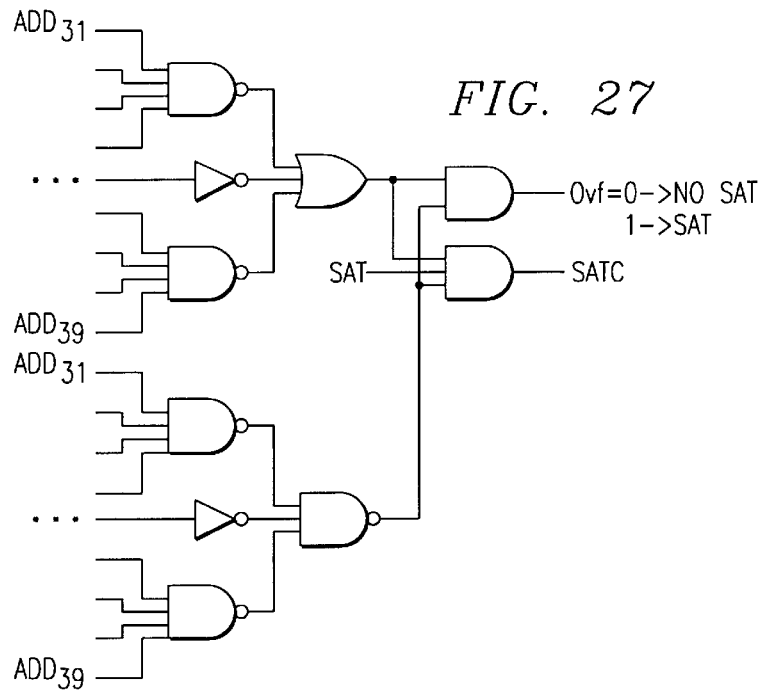
FIG. 27 describes a circuit for detecting overflow for extension bits.

FIG. 27 illustrates an example of 32 bit saturation detection logic of the decoding section that generates the overflow bit OVF and also a saturation bit SATC which is a function of a saturation control signal SAT, causing a saturation mode and the presence of the overflow bit OVF.

Overflow for extension bits is defined by the fact that Add[39:31] is either different from "0x1ff" or "0x000". The clamp value is then chosen based on the sign (Add[39]). If the RND signal is at one, Add[15:0] is set to "0x0000", in all cases. A cell is provided to generate the different values. There are two basic versions of this cell, one for bit positions lower than bit 15 and one for bit positions higher than bit 16. A special cell is provided for bit 16 to enable an unbiased rounding mode. If an unbiased rounding mode were not provided, the cell for bit 16 could be of the same type as for bit positions higher than 16. The various cells, which are described below, effectively define a multiplexor for selecting signals for the final accumulator.

Figure 28A:
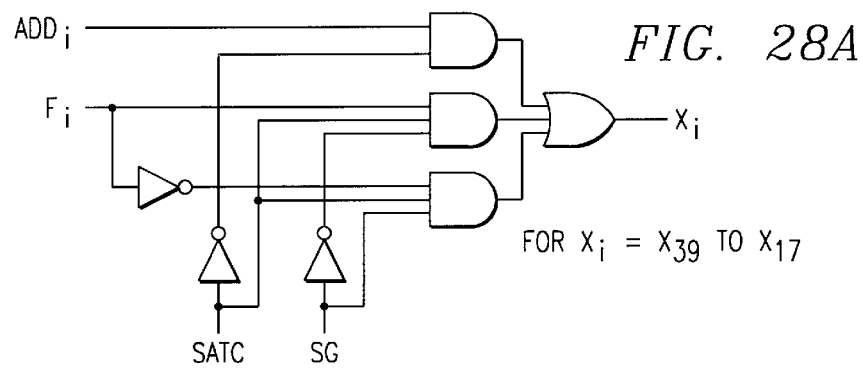
FIGS. 28A–28C describe cells of a saturation stage of the MAC of FIG. 8 including a cell for providing unbiased rounding.

FIG. 28A illustrates an example of a saturation control cell (multiplexor cell) suitable for each of bits X39 to X17. In this Figure, the signal $ADD_i$ is the bit to be added for the bit position i. The signal SG is bit is the sign bit represented by the $ADD_i$ bit for position 39 (i.e. $ADD_{39}$). The signal SATC is the saturation bit generated by the saturation detection logic of FIG. 27. The signal Fi is set to one or zero depending on the cell position.

Figure 28B:
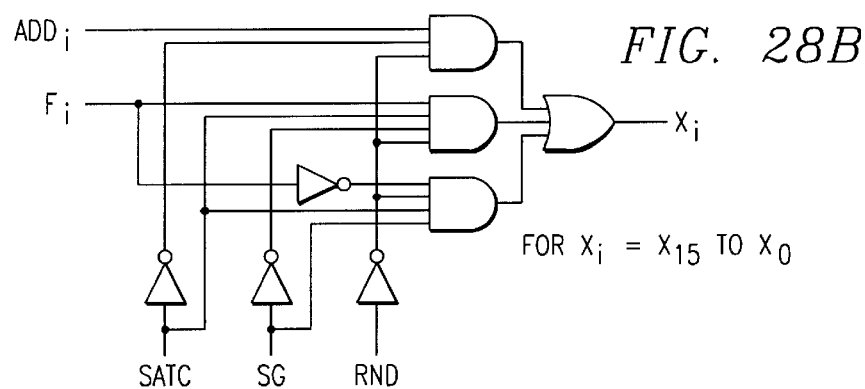

FIG. 28B illustrates an example of a saturation control cell (multiplexor cell) suitable for each of bits 15 to 0. Here the signal RND is a rounding signal. When this is active, rounding is effected on bits 15:0.

Figures 28C, 29A, 29B, 29C:
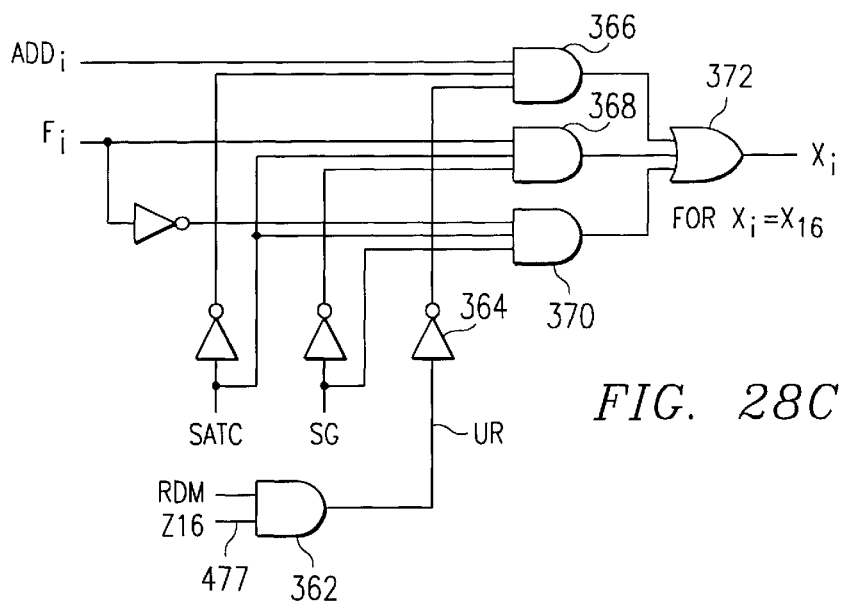
FIGS. 29A–29C illustrate the effect of unbiased rounding.

FIG. 28C illustrates an example of a saturation control cell (multiplexor cell) suitable for bit position 16. Here the signal UR is an unbiased rounding signal. This is generated when the zero anticipation signal Z16 477, from FIG. 25 is active, representative of a zero having been detected for bits 15:0 (i.e. the first 16 bits) and a signal RDM is active indicative of an unbiased rounding mode being active. The effect of signal SATC is to invalidate the Addi part of the multiplexor because saturation takes precedence over unbiased rounding. Thus a rounded result which overflows, e.g., for 32 bits, is represented as 7fff0000 and not 7ffe0000, and bit position 16 (i.e. the 17th bit) of the final adder is set to zero. The operation of the saturation control cell of FIG. 28C will now be described in more detail.

When the unbiased rounding mode is selected (RDM is asserted) and bits X15 to X0 are all zero (the Z16 bit is asserted), the output of an AND gate 362 forming the signal UR is high. The UR signal is inverted by the NOT gate 364 to generate the signal NUR, which in this case is low. The effect of the low signal is to dominate the AND gate 366, whereby the output of the OR gate 372 is zero, which has the effect of forcing bit X16 to zero. Thus, when the LSB field [15:0] has a value equal to 0.5 and the MSB field [31:16] has an odd value prior to rounding, bit X16 is set to zero. Likewise, when the LSB field has a value equal to 0.5 and the MSB field has an even value prior to rounding, bit X16 is not forced to zero.

When either the unbiased rounding mode is not selected (RDM is not asserted) or bits X15 to X0 are not all zero (the Z16 bit is not asserted), the output of the AND gate 362 forming the signal UR will be low. The inverted UR signal from the NOT gate 364, i.e. the NUR signal, is then high, whereby the NUR signal does not dominate the AND gate 366. As a result, the setting of bit X16 is controlled according to the saturation mode in the same manner as for bits X39 to X17. It will be appreciated that without the signal NUR, and the circuitry for generating that signal, the cell for bit position X16 corresponds to that for bit positions X39 to X17.

The presence of the special saturation cell of FIG. 28C, in combination with the zero anticipation circuitry as described above to force the 17th bit (bit position 16) to zero, can be used to effect unbiased rounding in an efficient manner.

Accordingly, there now follows an explanation of the effect of unbiased rounding. This differs from the previous rounding only in one case as illustrated in FIG. 29A namely where a calculation result is exactly P.5, where P.5 is a value half way between P and P+1, where P is a value expressed to a predetermined accuracy. In the particular example, P is a binary value with the 16 lowest significant bits zero.

In an embodiment of the invention, where unbiased rounding is selected and a zero is detected on the 16 lowest significant bits of a calculation result, after rounding, the 17th bit (X16) is forced to 0. This results in unbiased rounding in that, in the final 32 bits adder, addition of 1 at bit position 15 will already have occurred and the 16 lowest significant bits have a 0 value when the LSB field is exactly equal to 0.5. FIGS. 29B and 29C illustrate the two alternative states for X16 and the result that whatever its state at this time is, it is forced to 0, if zero detection has occurred.

The determination of whether the bits X16–X0 are zero is effected using the zero result anticipation approach mentioned with reference to FIGS. 19 to 26, after a "1" is added at bit X15 in response to the RND signal, as discussed with reference to FIG. 14.

In particular, zero anticipation is performed on a propagation tree of a carry lookahead structure. This uses the carry and sum generated from the partial product reduction tree 314. From the carry and sum, a zero result for the bit X16 is anticipated by mapping the propagation tree onto the one-zero result of the first 16 bits. This provides a propagation speed at least as fast as the carry propagation on the final adder. From the zero result, we can predict whether bit X16 of the MAC structure has to be forced to zero or not.

Figure 30:
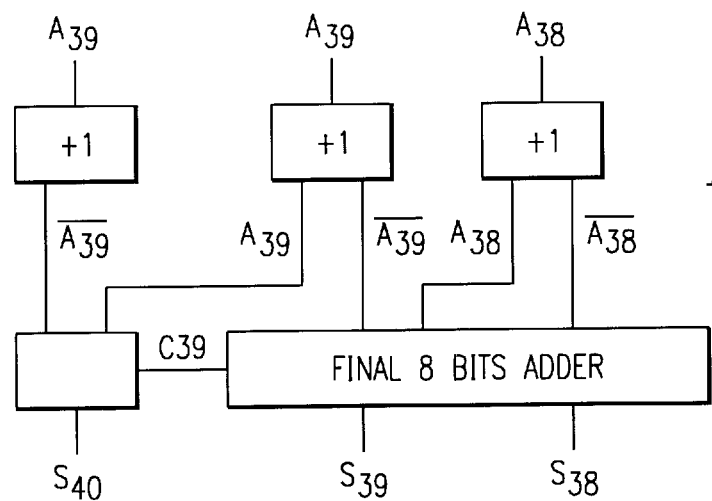
FIG. 30 is a schematic block diagram of overflow detection circuitry.

FIG. 30 illustrates logic for detecting an overflow on 40 bits. A control bit ovf4O (see FIG. 9) enables an overflow on 32 bits if it is off, or an overflow on 40 bits if it is on. This detection occurs in a final 8 bits adder. A 40 bit overflow will occur if the final sum for bit 39, S[39], is different from the final sum for bit 40, S[40]. S[40] is not calculated but can deduced using the logic in FIG. 30, and as follows:

$$S40 = \overline{A39} \oplus A39 \oplus C39 = C39$$

$$S39 = \overline{A39} \oplus A38 \oplus C38,$$

where $\underline{A39}$ means the inverse of the $A39$ signal.

If S39 differs from S40, there is an overflow. Accordingly, the overflow (OVF) is derived as follows:

$$OVF = S40 \oplus S39$$

$$OVF = C39 \oplus A39 \oplus A38 \oplus C38$$

OVF is directly derived with 2 XOR gates. The final result is forced to 0x7fffffff or 0x8000000000 if the saturation signal (SAT) is on.

Figure 31:
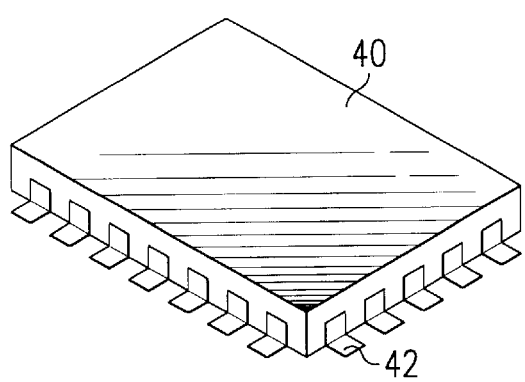
FIG. 31 is a schematic representation of an integrated circuit incorporating the processor of FIG. 1.

FIG. 31 is a schematic representation of an integrated circuit 40 incorporating the invention. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

Figure 32:
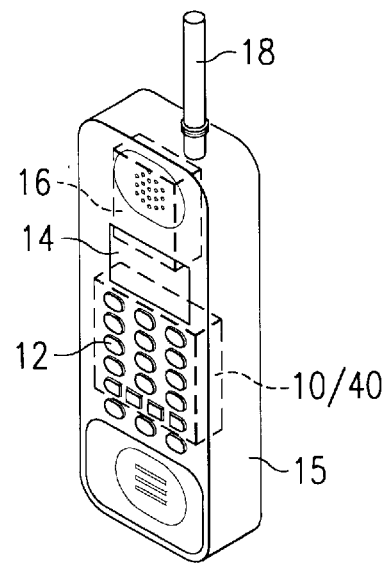
FIG. 32 is a schematic representation of a mobile telecommunications device incorporating the processor of FIG. 1.

One application for a processing engine such as the processor 10, for example as incorporated in an integrated circuit as in FIG. 31, is in a telecommunications device, for example a mobile wireless telecommunications device. FIG. 32 illustrates one example of such a telecommunications device. In the specific example illustrated in FIG. 32, the telecommunications device is a mobile telephone 11 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Thus, there has been described a particular exemplary embodiment of a mechanism and method for providing unbiased rounding. In the particular embodiment, unbiased rounding is effected by forcing bit 16 to a predetermined value, here logical zero, when bits 15–0 are anticipated as being zero. It will be appreciated that this is one specific example. More generally, the (N+1)th bit could be forced to that logical value when bits N–0 are anticipated as being zero. Also, this description has been given specifically with respect to a multiply and accumulate (MAC) unit of a processor. However, the invention is not limited thereto and finds general application to arithmetic units of processing engines. It can find application, by way of examples only, to a floating point unit where rounding is to be effected to a given number of significant places, to a floating point unit with sticky bit indication for realignment to enable addition of a mantissa and to fixed point units for overflow anticipation. Accordingly, the invention finds general application to application to arithmetic units, and the description is to be understood to be exemplary only, and not to be limiting.

Thus, it will be appreciated that although particular embodiments of the invention have been described, many modifications/additions and/or substitutions may be made within the scope of the present invention.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system, comprising a processing engine with an arithmetic unit, wherein the arithmetic unit comprises:
   arithmetic circuitry for performing an arithmetic operation to generate an arithmetic result of two or more operands;
   zero anticipation circuitry for anticipating a logical zero on N least significant bits of the result by encoding a portion of the two or more operands, such that the zero anticipation circuitry operates on the two or more operands in parallel with the arithmetic circuitry; and
   unbiased rounding circuitry for forcing a predetermined logic value on the (N+1)th least significant bit of the result, the unbiased rounding circuitry being responsive to a zero anticipation output signal from the zero anticipation circuitry, such that if a logical zero is not anticipated on the N least significant bits of the result then the (N+1)th least significant bit of the result is not modified.

2. The arithmetic unit according to claim 1, wherein the predetermined logical value is logical zero.

3. The arithmetic unit according to claim 1, wherein the zero anticipation circuit comprises a carry propagation tree responsive to carry results of the arithmetic circuit for anticipating a zero on each of N least significant bits of an arithmetic result to generate the zero anticipation output signal, the unbiased rounding circuit being responsive to the output signal for forcing the (N+1)th least significant bit of the result to logical zero where a logic zero is anticipated on N lowest significant bits of the result.

4. The arithmetic unit according to claim 3, wherein the unbiased rounding circuit is selectively operable to provide unbiased rounding.

5. The arithmetic unit according to claim 4, wherein the unbiased rounding circuit comprises a multiplexor responsive to an unbiased rounding select signal selectively to enable forcing of the (N+1)th bit to logical zero.

6. The arithmetic unit according to claim 5, wherein the arithmetic circuit is a multiply and accumulate circuit comprising a partial product reduction tree providing carry results, and a final adder connected to the partial production reduction tree holding the result.

7. The arithmetic unit according to claim 6, wherein the multiply and accumulate circuit provides X-by-Y bit multiplication with accumulation on M bits.

8. The arithmetic unit according to claim 1, wherein the arithmetic unit is a floating point unit with rounding to a nearest sticky bit.

9. The arithmetic unit according to claim 1, wherein the arithmetic unit is a fixed point unit with overflow anticipation.

10. The digital system of claim 1 being a cellular telephone, further comprising:
- an integrated keyboard connected to the processor via a keyboard adapter;
- a display, connected to the processor via a display adapter;
- radio frequency (RF) circuitry connected to the processor; and
- an aerial connected to the RF circuitry.

11. A method for unbiased rounding in an arithmetic unit of a processing engine, the method comprising the steps of:
- performing an arithmetic operation on a set of operands to generate an arithmetic result;
- anticipating a logical zero on N least significant bits of the result by encoding a portion of the set of operands in parallel with the step of performing the arithmetic operation; and
- forcing a predetermined logical value on the (N+1)th least significant bit of the result only where a logic zero is anticipated on N least significant bits of the result, otherwise not modifying the (N+1)th least significant bit of the result.

12. The method according to claim 11, wherein the predetermined logical value is logical zero.

13. The method according to claim 11, wherein the step of performing an arithmetic operation comprises adding a value of $2^N$ into the arithmetic result when rounding is enabled such that the step of anticipating is responsive to this step of adding.

14. The method according to claim 13, wherein the step of anticipating a logical zero is effected by performing carry propagation in a carry propagation tree in response to carry results of an arithmetic circuit and generating an output signal where a logical zero is anticipated on N least significant bits of the result.

15. The method according to claim 14, comprising selectively supplying an unbiased rounding select signal to selectively enable forcing of the (N+1)th bit to zero when a logical zero is anticipated for N lowest significant bits.

16. The method according to claim 15, wherein the arithmetic circuit is a multiply and accumulate circuit comprising a partial product reduction tree providing carry results, and a final adder connected to the partial production reduction tree holding the result.

17. The method according to claim 11, wherein the multiply and accumulate circuit provides X-by-Y bit multiplication with accumulation on M bits.

18. The method according to claim 15, further comprising the step of generating an zero anticipation result output where all the bits of the result, or a predetermined number greater than N of least significant bits, are all anticipated to be logical zero.

* * * * *